(12) United States Patent
McDonald et al.

(10) Patent No.: US 12,277,490 B2
(45) Date of Patent: Apr. 15, 2025

(54) EFFICIENT BINARY REPRESENTATIONS FROM NEURAL NETWORKS

(71) Applicant: Google LLC, Mountain View, CA (US)

(72) Inventors: Ryan McDonald, London (GB); Luis Sarmento, London (GB)

(73) Assignee: Google LLC, Mountain View, CA (US)

( * ) Notice: Subject to any disclaimer, the term of this patent is extended or adjusted under 35 U.S.C. 154(b) by 382 days.

(21) Appl. No.: 17/270,404

(22) PCT Filed: Apr. 14, 2020

(86) PCT No.: PCT/US2020/028119
§ 371 (c)(1),
(2) Date: Feb. 22, 2021

(87) PCT Pub. No.: WO2021/211099
PCT Pub. Date: Oct. 21, 2021

(65) Prior Publication Data
US 2023/0033694 A1    Feb. 2, 2023

(51) Int. Cl.
*G06N 3/048* (2023.01)
*G06N 3/088* (2023.01)

(52) U.S. Cl.
CPC ............. *G06N 3/048* (2023.01); *G06N 3/088* (2013.01)

(58) Field of Classification Search
CPC .. G06N 3/00; G06N 5/00; G06N 7/00; G06N 10/00; G06N 20/00; G06N 99/00
See application file for complete search history.

(56) References Cited

U.S. PATENT DOCUMENTS 4,874,963 A    10/1989  Alspector
2019/0122116 A1    4/2019  Choi et al.

FOREIGN PATENT DOCUMENTS

| CN | 109002942 A | 12/2018 |
| CN | 106650918 B | 8/2019 |
| CN | 110674920 A | 1/2020 |

(Continued)

OTHER PUBLICATIONS

Jiwei Yang, Xu Shen, Jun Xing, Xinmei Tian, Houqiang Li, Bing Deng, Jianqiang Huang, & Xiansheng Hua. (2019). Quantization Networks. (Year: 2019).*

(Continued)

*Primary Examiner* — Kakali Chaki
*Assistant Examiner* — Johnathan R Germick
(74) *Attorney, Agent, or Firm* — McDonnell Boehnen Hulbert & Berghoff LLP

(57) ABSTRACT

Persistent storage contains a representation of a neural network including an input layer, and output layer, and a hidden layer, wherein nodes of the hidden layer incorporate serialized activation functions, wherein the serialized activation functions for each of the nodes include a sigmoid function and a Beta function, wherein the sigmoid function is applied to weighted outputs from nodes of a previous layer of the neural network, wherein the Beta function is applied to a conductance hyper-parameter and respective outputs of the sigmoid function, and wherein outputs of the Beta function are provided to a subsequent layer of the neural network. One or more processors are configured to train the neural network until the outputs of the sigmoid function for the nodes of the hidden layer are substantially binary.

22 Claims, 14 Drawing Sheets

(a) Activation    (b) $y_i$ when $s_i$ close to the extremes (c) $y_i$ when $s_i$ close to 0.5

(56) References Cited

FOREIGN PATENT DOCUMENTS

| | | |
|---|---|---|
| CN | 110663049 B | 12/2023 |
| JP | 2016218513 A | 12/2016 |

OTHER PUBLICATIONS

Naima Chouikhi, & Adel M. Alimi. (2018). Adaptive Extreme Learning Machine for Recurrent Beta-basis Function Neural Network Training. (Year: 2018).*

China National Intellectual Property Administration, First Office Action mailed Jul. 16, 2024, issued in connection with Chinese Patent Application No. 202080005760.5, 27 pages (includes English Translation).

Dzmitry Bahdanau, Kyunghyun Cho, and Yoshua Bengio. Neural machine translation by jointly learning to align and translate. arXiv preprint arXiv:1409.0473, 2014, 16 pages.

Joost Bastings, Wilker Aziz, and Ivan Titov. Interpretable neural predictions with differentiable binary variables. arXiv preprint arXiv:1905.08160, 2019, 15 pages.

Jan A Botha, Emily Pitler, Ji Ma, Anton Bakalov, Alex Salcianu, David Weiss, Ryan McDonald, and Slav Petrov. Natural language processing with small feed-forward networks. arXiv preprint arXiv:1708.00214, 2017, 10 pages.

Dan Ciresan, Ueli Meier, and Jurgen Schmidhuber. Multi-column deep neural networks for image classification. In 2012 IEEE conference on computer vision and pattern recognition, pp. 3642-3649. IEEE, 2012.

Ronan Collobert, Jason Weston, L'eon Bottou, Michael Karlen, Koray Kavukcuoglu, and Pavel Kuksa. Natural language processing (almost) from scratch. Journal of machine learning research, (Aug. 2012):2493-2537, 2011.

Jacob Devlin, Ming-Wei Chang, Kenton Lee, and Kristina Toutanova. Bert: Pre-training of deep bidirectional transformers for language understanding. arXiv preprint arXiv:1810.04805, 2018, 14 pages.

Mikhail Figurnov, Shakir Mohamed, and Andriy Mnih. Implicit reparameterization gradients. In S. Bengio, H. Wallach, H. Larochelle, K. Grauman, N. Cesa-Bianchi, and R. Garnett, editors, Advances in Neural Information Processing Systems 31. Curran Associates, Inc., 2018, 12 pages. URL http://papers.nips.cc/paper/7326-implicit-reparameterization-gradients.pdf.

Awni Hannun, Carl Case, Jared Casper, Bryan Catanzaro, Greg Diamos, Erich Elsen, Ryan Prenger, Sanjeev Satheesh, Shubho Sengupta, Adam Coates, et al. Deep speech: Scaling up end-to-end speech recognition. arXiv preprint arXiv:1412.5567, 2014, 12 pages.

Kaiming He, Xiangyu Zhang, Shaoqing Ren, and Jian Sun. Deep residual learning for image recognition. In Proceedings of the IEEE conference on computer vision and pattern recognition, pp. 770-778, 2016.

Irina Higgins, Loic Matthey, Arka Pal, Christopher Burgess, Xavier Glorot, Matthew M Botvinick, Shakir Mohamed, and Alexander Lerchner. beta-vae: Learning basic visual concepts with a constrained variational framework. In ICLR, 2017, 13 pages.

Geoffrey Hinton, Oriol Vinyals, and Jeff Dean. Distilling the knowledge in a neural network. arXiv preprint arXiv:1503.02531, 2015, 9 pages.

Armand Joulin, Edouard Grave, Piotr Bojanowski, Matthijs Douze, H'erve J'egou, and Tomas Mikolov. Fasttext. zip: Compressing text classification models. arXiv preprint arXiv:1612.03651, 2016, 13 pages.

Diederik P. Kingma and Max Welling. Auto-encoding variational bayes. In 2nd International Conference on Learning Representations, ICLR 2014, Banff, AB, Canada, Apr. 14-16, 2014, 14 pages, Conference Track Proceedings, 2014. URL http://arxiv.org/abs/1312.6114.

Hanxiao Liu, Karen Simonyan, and Yiming Yang. Darts: Differentiable architecture search. arXiv preprint arXiv:1806.09055, 2018, 12 pages.

Jian-Hao Luo, Jianxin Wu, and Weiyao Lin. Thinet: A filter level pruning method for deep neural network compression. In Proceedings of the IEEE international conference on computer vision, pp. 5058-5066, 2017.

Scott Mayer Mckinney, Marcin Sieniek, Varun Godbole, Jonathan Godwin, Natasha Antropova, Hutan Ashrafian, Trevor Back, Mary Chesus, Greg C Corrado, Ara Darzi, et al. International evaluation of an ai system for breast cancer screening. Nature, 577(7788):89-94, 2020.

Aaron van den Oord, Sander Dieleman, Heiga Zen, Karen Simonyan, Oriol Vinyals, Alex Graves, Nal Kalchbrenner, Andrew Senior, and Koray Kavukcuoglu. Wavenet: A generative model for raw audio. arXiv preprint arXiv:1609.03499, 2016, 15 pages.

Matthew E Peters, Mark Neumann, Mohit Iyyer, Matt Gardner, Christopher Clark, Kenton Lee, and Luke Zettlemoyer. Deep contextualized word representations. arXiv preprint arXiv:1802.05365, 2018, 15 pages.

Hieu Pham, Melody Y Guan, Barret Zoph, Quoc V Le, and Jeff Dean. Efficient neural architecture search via parameter sharing. arXiv preprint arXiv:1802.03268, 2018, 11 pages.

Mohammad Rastegari, Vicente Ordonez, Joseph Redmon, and Ali Farhadi. Xnor-net: Imagenet classification using binary convolutional neural networks. In European conference on computer vision, pp. 525-542. Springer, 2016.

Victor Sanh, Lysandre Debut, Julien Chaumond, and ThomasWolf. Distilbert, a distilled version of bert: smaller, faster, cheaper and lighter. arXiv preprint arXiv:1910.01108, 2019, 5 pages.

Dinggang Shen, GuorongWu, and Heung-Il Suk. Deep learning in medical image analysis. Annual review of biomedical engineering, 19:221-248, 2017.

Dinghan Shen, Pengyu Cheng, Dhanasekar Sundararaman, Xinyuan Zhang, Qian Yang, Meng Tang, Asli Celikyilmaz, and Lawrence Carin. Learning compressed sentence representations for ondevice text processing. In Proceedings of the 57th Annual Meeting of the Association for Computational Linguistics, pp. 107-116, Florence, Italy, Jul. 2019. Association for Computational Linguistics. doi: 10.18653/v1/P19-1011.

Latanya Sweeney. k-anonymity: A model for protecting privacy. International Journal of Uncertainty, Fuzziness and Knowledge-Based Systems, 10(05):557-570, 2002.

Naftali Tishby and Noga Zaslavsky. Deep learning and the information bottleneck principle. In 2015 IEEE Information Theory Workshop (ITW), pp. 1-5. IEEE, 2015.

Julien Tissier, Amaury Habrard, and Christophe Gravier. Near-lossless binarization of word embeddings.CoRR, abs/1803.09065, 2018, 8 pages.

Yonghui Wu, Mike Schuster, Zhifeng Chen, Quoc V Le, Mohammad Norouzi,Wolfgang Macherey, Maxim Krikun, Yuan Cao, Qin Gao, Klaus Macherey, et al. Google's neural machine translation system: Bridging the gap between human and machine translation. arXiv preprint arXiv:1609.08144, 2016, 23 pages.

Barret Zoph and Quoc V Le. Neural architecture search with reinforcement learning. arXiv preprint arXiv:1611.01578, 2016, 15 pages.

International Search Report and Written Opinion mailed Feb. 24, 2021, in connection with International Application No. PCT/US2020/028119, filed Apr. 14, 2020, 14 pages.

* cited by examiner

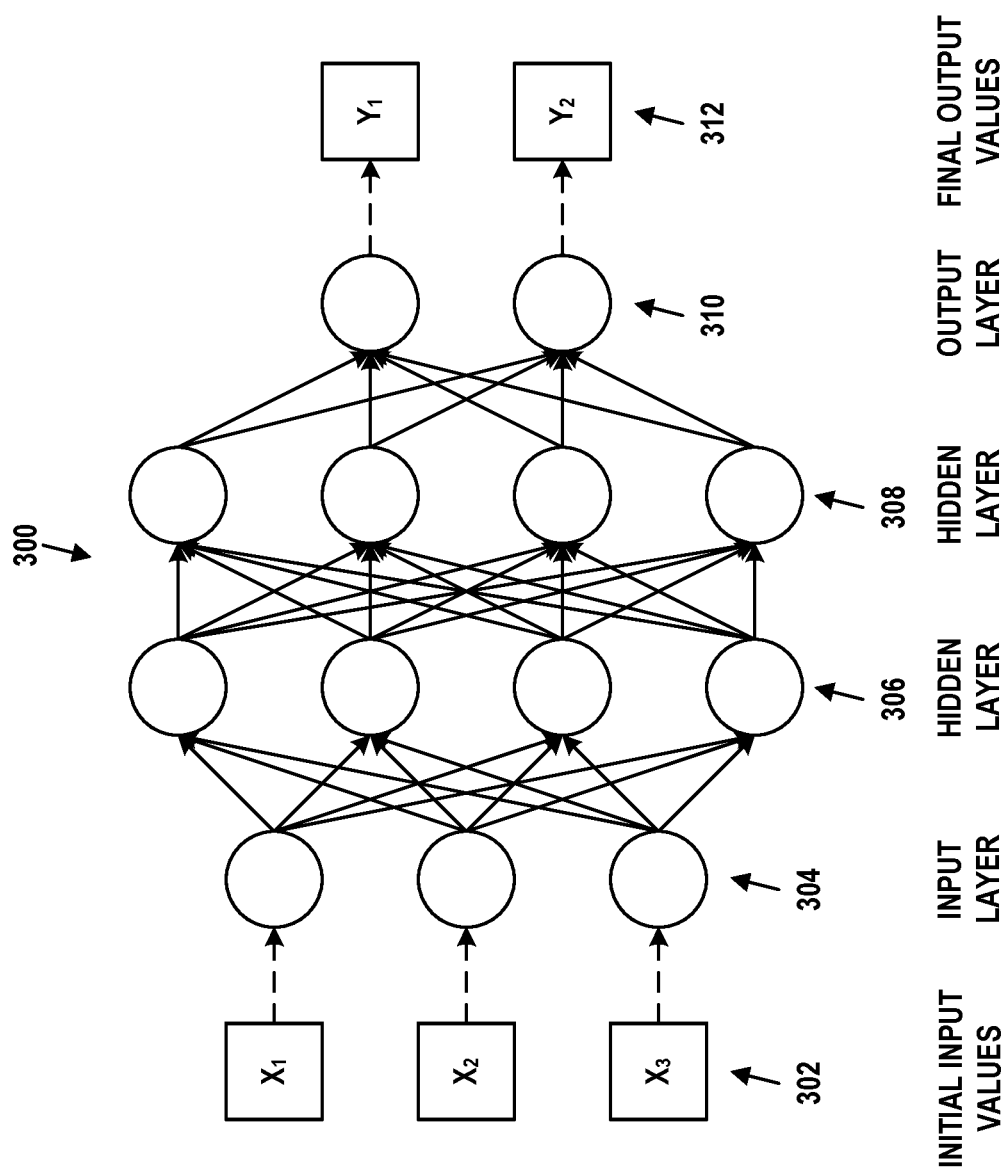

600

| % Accuracy Baseline Transcoder $T_\alpha$ | | | | Beta Transcoder $T_\beta$ | | |
|---|---|---|---|---|---|---|
| # dims | 32-bit | 8-bit Quant. | 1-bit Quant. | Best Acc. | ε | Δ |
| 64 | 84.65 | 83.68 | 0.34 | 46.33 | 1.0 | -38.32 |
| 96 | 91.37 | 90.10 | 2.01 | 59.15 | 0.1 | -32.22 |
| 128 | 95.54 | 94.30 | 4.82 | 68.90 | 0.1 | -26.45 |
| 192 | 97.77 | 97.27 | 10.60 | 79.86 | 0.2 | -17.81 |
| 256 | 98.41 | 97.92 | 12.80 | 86.96 | 2.0 | -11.45 |
| 320 | 98.55 | 97.93 | 9.22 | 90.83 | 1.0 | -7.72 |
| 384 | 98.61 | 97.36 | 6.70 | 92.44 | 2.0 | -6.17 |
| 448 | 98.70 | 98.32 | 3.41 | 93.51 | 2.0 | -5.19 |
| 512 | 98.62 | 97.80 | 1.83 | 93.92 | 1.0 | -4.70 |
| 576 | 98.71 | 98.15 | 0.36 | 94.11 | 1.0 | -4.60 |
| 640 | 98.62 | 98.14 | 0.13 | 94.69 | 2.0 | -3.93 |
| 768 | 98.44 | 97.48 | 0.01 | 94.46 | 1.9 | -3.98 |
| 896 | 98.41 | 97.51 | 0.01 | 93.39 | 0.5 | -5.02 |

FIG. 10

1200 — OBTAIN, BY A COMPUTING SYSTEM, A REPRESENTATION OF A NEURAL NETWORK INCLUDING AN INPUT LAYER, AND OUTPUT LAYER, AND A HIDDEN LAYER, WHEREIN NODES OF THE HIDDEN LAYER INCORPORATE SERIALIZED ACTIVATION FUNCTIONS, WHEREIN THE SERIALIZED ACTIVATION FUNCTIONS FOR EACH OF THE NODES INCLUDE A SIGMOID FUNCTION AND A BETA FUNCTION, WHEREIN THE SIGMOID FUNCTION IS APPLIED TO WEIGHTED OUTPUTS FROM NODES OF A PREVIOUS LAYER OF THE NEURAL NETWORK, WHEREIN THE BETA FUNCTION IS APPLIED TO A CONDUCTANCE HYPER-PARAMETER AND RESPECTIVE OUTPUTS OF THE SIGMOID FUNCTION, AND WHEREIN OUTPUTS OF THE BETA FUNCTION ARE PROVIDED TO A SUBSEQUENT LAYER OF THE NEURAL NETWORK

1202 — TRAIN, BY THE COMPUTING SYSTEM, THE NEURAL NETWORK UNTIL THE OUTPUTS OF THE SIGMOID FUNCTION FOR THE NODES OF THE HIDDEN LAYER ARE SUBSTANTIALLY BINARY

FIG. 12

EFFICIENT BINARY REPRESENTATIONS FROM NEURAL NETWORKS

CROSS REFERENCE TO RELATED APPLICATION

This application is a U.S. national phase of International Application No. PCT/US2020/028119, filed Apr. 14, 2020, which is incorporated herein by reference in its entirety.

BACKGROUND

With the dramatic increase in server device processing power and the availability of high-volume data sets for training, machine learning models are becoming larger and more complicated. For example, deep neural networks are now being used to solve problems in natural language processing, image processing, computer vision, robotics, and health care. Due to the size of these neural networks and the extent and quality of the training data, results that have previously been unattainable can now be provided. On the other hand, devices with limited memory, processing power, and battery life, such as laptops, tablets, and smartphones, are still resource constrained. These limited devices may be unable to obtain results from a trained model in a reasonable time frame or at all.

SUMMARY

Neural networks may consist of a number of layers of nodes, each node in a layer outputting a value that is the result of applying a weighted activation function to the outputs of nodes in the previous layer. Often, these outputs are real numbers represented in floating point variables. As each of these variables may be 32 or 64 bits in length, a neural network with hundreds, thousands, or tens of thousands of nodes can have a very large representation. Further, operations on floating point numbers tend to be more resource-intensive than integer or binary operations. As a consequence, limited devices may not be able to store and/or execute a large model.

One way of addressing this problem would be to quantize each node's output down to a small number of possible values that could be represented in a few bits during training. For example, a binary output representation could result in dramatic model size reductions and less computational complexity. However, such quantization has traditionally had at least two drawbacks: (i) a quantization function could be effectively non-differentiable, which prevents the back-propagation algorithms used by neural networks from working properly, and (ii) valuable information can be lost by quantization, reducing the quality of the model. Thus, it was generally believed that binarization of node outputs was unworkable in practice.

The embodiments herein introduce a technique for performing this binarization that overcomes the aforementioned problems. In particular, existing activation function outputs are augmented during training with a stochastic node, where values are sampled from a Beta distribution parameterized by the value of the original activation function output. This results in a stochastic activation function that only reliably passes signal when it is operating in a quasi-binary regime. At inference time (when the neural network is executed to produce results), this stochastic activation can be substituted by a thresholding operation that outputs a binary representation, with only minor performance degradation and superior behavior relative to post-training quantization. These desirable characteristics are verified by a probabilistic model for the proposed stochastic activation function, which shows that under an information maximization scenario, this system will theoretically converge to producing binarized representations.

As a consequence, the embodiments herein can obtain the same or similar performance as a neural network without the stochastic augmentation, but with much better performance per stored bit. Thus, models trained in such a fashion have a smaller memory profile and can be used by devices with fewer computational resources.

Accordingly, a first example embodiment may involve persistent storage containing a representation of a neural network including an input layer, and output layer, and a hidden layer, wherein nodes of the hidden layer incorporate serialized activation functions, wherein the serialized activation functions for each of the nodes include a sigmoid function and a Beta function, wherein the sigmoid function is applied to weighted outputs from nodes of a previous layer of the neural network, wherein the Beta function is applied to a conductance hyper-parameter and respective outputs of the sigmoid function, and wherein outputs of the Beta function are provided to a subsequent layer of the neural network. One or more processors may be configured to train the neural network until the outputs of the sigmoid function for the nodes of the hidden layer are substantially binary.

A second example embodiment may involve persistent storage containing a representation of a neural-network-based encoder including an input layer and an output layer, wherein nodes of the output layer incorporate serialized activation functions, wherein the serialized activation functions for each of the nodes include a sigmoid function and a thresholding function, wherein the sigmoid function is applied to weighted outputs from nodes of a previous layer of the neural-network-based encoder, wherein the thresholding function is applied to outputs of the sigmoid function, wherein outputs of the thresholding function are binary, wherein the output layer was trained as a hidden layer of a neural-network-based auto-encoder, and wherein during training the thresholding function was replaced by a Beta function that was applied to a conductance hyper-parameter and respective outputs of the sigmoid function. One or more processors may be configured to: (i) introduce input to the input layer; (ii) apply the serialized activation functions to the weighted outputs from the nodes of the previous layer; and (iii) provide binary outputs from the output layer.

A third example embodiment may involve obtaining, by a computing system, a representation of a neural network including an input layer, and output layer, and a hidden layer, wherein nodes of the hidden layer incorporate serialized activation functions, wherein the serialized activation functions for each of the nodes include a sigmoid function and a Beta function, wherein the sigmoid function is applied to weighted outputs from nodes of a previous layer of the neural network, wherein the Beta function is applied to a conductance hyper-parameter and respective outputs of the sigmoid function, and wherein outputs of the Beta function are provided to a subsequent layer of the neural network. The third example embodiment may also involve training, by the computing system, the neural network until the outputs of the sigmoid function for the nodes of the hidden layer are substantially binary.

A fourth example embodiment may involve obtaining, by a computing system, a representation of a neural-network-based encoder including an input layer and an output layer, wherein nodes of the output layer incorporate serialized activation functions, wherein the serialized activation functions for each of the nodes include a sigmoid function and a thresholding function, wherein the sigmoid function is applied to weighted outputs from nodes of a previous layer of the neural-network-based encoder, wherein the thresholding function is applied to outputs of the sigmoid function, wherein outputs of the thresholding function are binary, wherein the output layer was trained as a hidden layer of a neural-network-based auto-encoder, and wherein during training the thresholding function was replaced by a Beta function that was applied to a conductance hyper-parameter and respective outputs of the sigmoid function. The fourth example embodiment may also involve introducing, by the computing system, input to the input layer. The fourth example embodiment may also involve applying, by the computing system, the serialized activation functions to the weighted outputs from the nodes of the previous layer. The fourth example embodiment may also involve providing, by the computing system, binary outputs from the output layer.

In a fifth example embodiment, an article of manufacture may include a non-transitory computer-readable medium, having stored thereon program instructions that, upon execution by a computing system, cause the computing system to perform operations in accordance with the first, second, third, and/or fourth example embodiment.

In a sixth example embodiment, a computing system may include at least one processor, as well as memory and program instructions. The program instructions may be stored in the memory, and upon execution by the at least one processor, cause the computing system to perform operations in accordance with the first, second, third, and/or fourth example embodiment.

In a seventh example embodiment, a system may include various means for carrying out each of the operations of the first, second, third, and/or fourth example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 3 depicts a neural network, in accordance with example embodiments.

FIG. 10 depicts a table that compares the accuracy of a neural network trained using the stochastic activation versus standard neural networks, in accordance with example embodiments.

FIG. 12 is a flow chart, in accordance with example embodiments.

DETAILED DESCRIPTION

Figure 1:
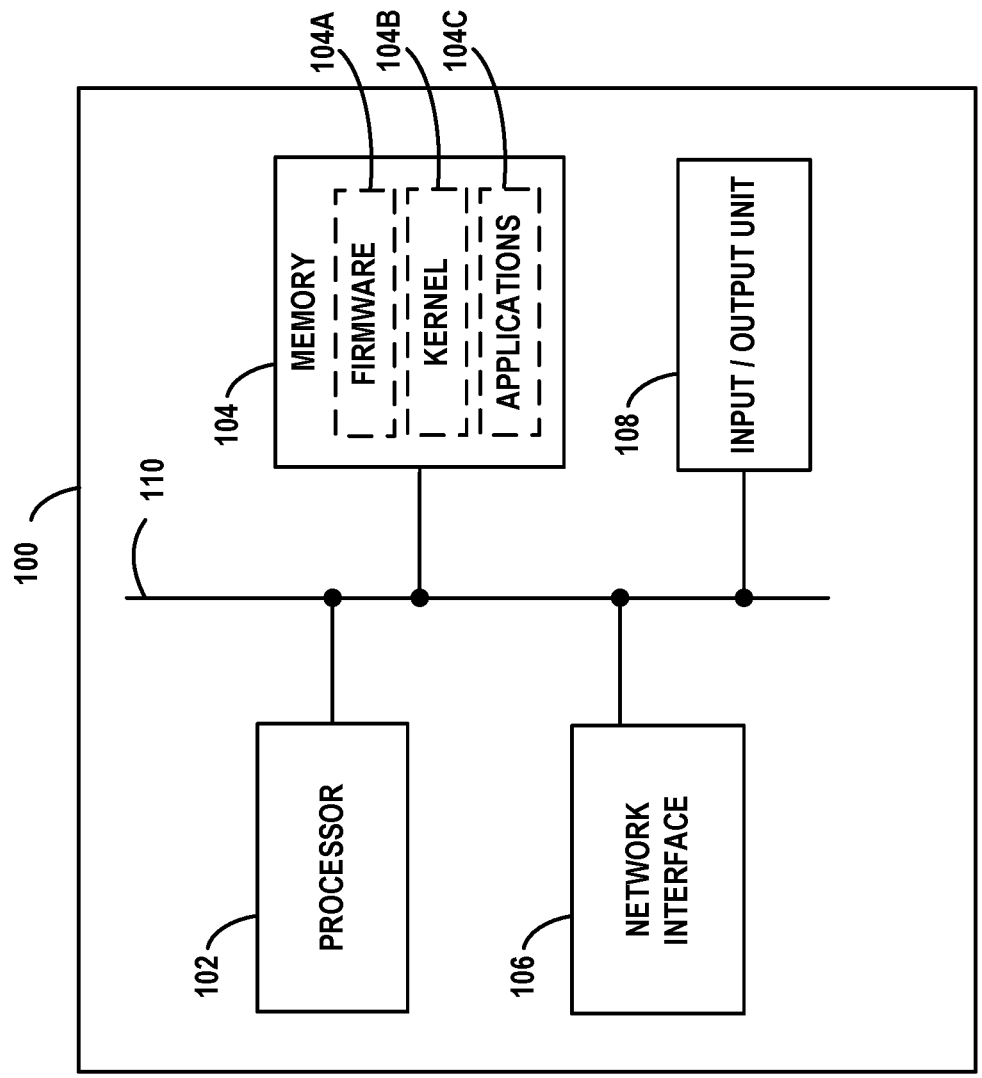
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

Deep learning has been transformational across almost every discipline in which it has been applied, from perception, translation, speech, language understanding, science, and medicine. Key to the success of deep learning has been a consistent increase in model capacity, defined either by the size of the architecture, e.g., number of layers or hidden dimensions, or the size of the parameters, both of which are typically correlated.

While larger model capacity can lead to dramatic improvements in accuracy—especially when coupled with large amounts of training data—it has the primary disadvantage of requiring more computing resources, both during training but more critically when models are being served in some environment. Larger representations, more parameters and deeper architectures all require more computation (CPUs, GPUs, etc.). Larger representations and parameter spaces require more memory, which can be critical when serving models in embedded environments such as mobile phones. Finally, larger representations, e.g., embedding look-up tables or hidden layers, can further use storage space in situations such as retrieval, where these representations must persist. These observations have led to a number of studies on how to make deep learning methods more computationally efficient, ideally with minimal drops in quality. These include model compression, model distillation, and optimal architecture search, amongst others.

The embodiments herein focus on an extreme case of compression—binarization of representations. Binarized representations—e.g., hidden layers or embedding look-up tables—can have many practical advantages. First and foremost, it offers the most aggressive form of quantization for model compression, which could lead to dramatically smaller representations being stored and processed. Second, binarized neural networks can be significantly faster than non-binarized neural networks. Third, it provides a hard assignment of hidden representations, which could make models more interpretable, e.g., via hard-attention mechanisms. Finally, it is a natural way to make representations satisfy k-anonymity constraints in privacy-strict data environments, i.e., an N-dimension binary representation makes the data $2^N$-anonymized. To this point, one could cast binarized neural representations as k-anonymized neural networks.

The techniques herein binarize representations in neural network models via stochastic Beta activations. These are stochastic nodes that add noise to the output of sigmoid-based representations via sampling from a specialized Beta distribution during training of the network. The focus is primarily on the establishing the mathematical properties and empirical behavior of this method. Specifically, it is shown under what assumptions this method will guarantee that the model learn binarized representations, and empirical studies verify the general behavior of the model and, more importantly, that indeed binarization happens in practice.

The following embodiments describe architectural and functional aspects of example computing systems on which neural networks can be trained and deployed.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on.

Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to train a neural network model or to execute a trained neural network model. The exact physical location, connectivity, and configuration of these computing devices may be unknown and/or unimportant to client devices. Accordingly, the computing devices may be referred to as "cloud-based" devices that may be housed at various remote data center locations.

Figure 2:
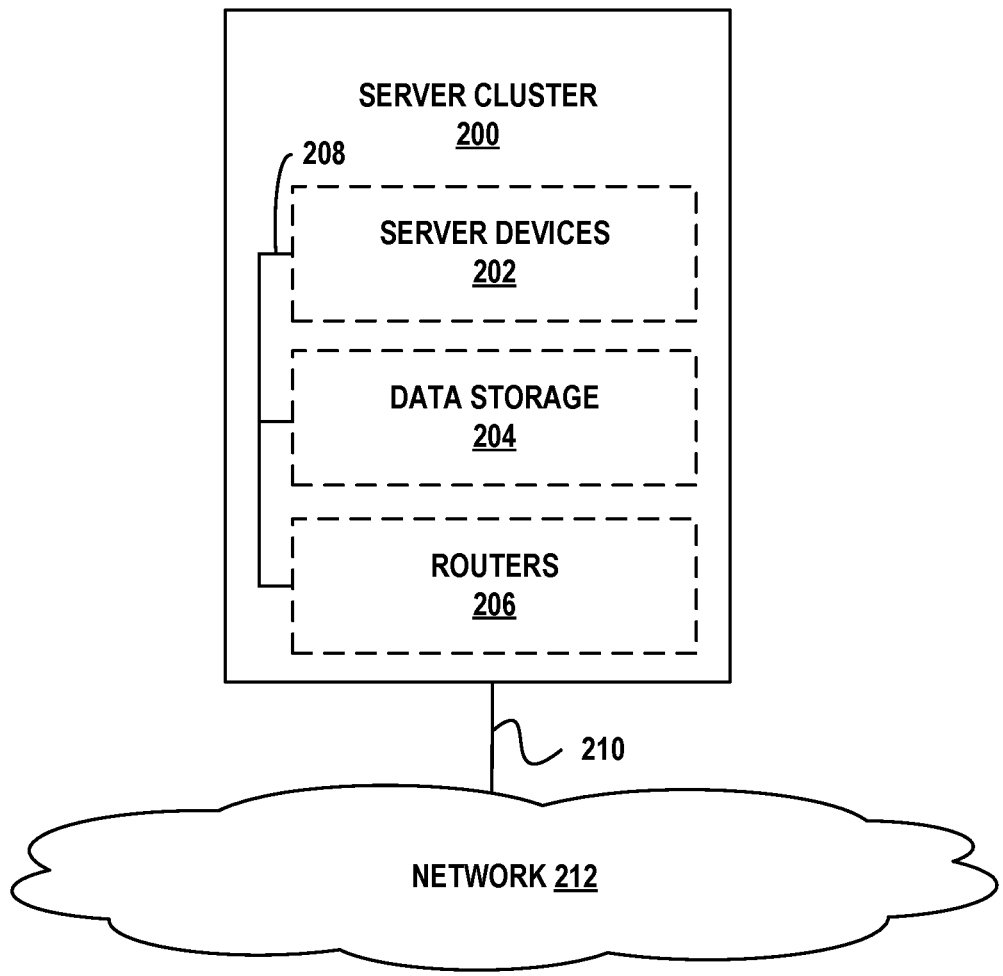
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

Advantageously, server cluster 200 may be sufficient computing resource to be able to train and execute large and complex neural networks.

III. RELEVANT PROPERTIES

This section describes some of the properties of the Beta function and related functions. Familiarity with these properties can help provide a basis for understanding why the binarization embodiments herein are able to improve the per-bit performance of a neural network A. Gamma, Digamma, and Polygamma Functions The Gamma function is defined as:

$$\Gamma(z) = \int_0^\infty x^{z-1} e^{-x} dx \quad (1)$$

When z is positive, the Gamma function can be defined with the following recurrence:

$$\Gamma(z+1) = z \cdot \Gamma(z) \quad (2)$$

The Digamma function is the logarithmic derivative of the Gamma function:

$$\psi(x) = \frac{d}{dx} \ln(\Gamma(z)) \quad (3)$$

The Polygamma function is a generalization of the Digamma function, and is defined as the (m+1)th derivative of the logarithm of the Gamma function:

$$\psi(x)^m = \frac{d}{dx} \psi(x)^{m-1} = \frac{d^{m+1}}{dx^{m+1}} \ln(\Gamma(z)) \quad (4)$$

The Digamma function is thus the Polygamma function with m=0. For simplicity, the order of the derivative is usually omitted from the Digamma function.

B. Beta Function

The Beta function is defined as:

$$B(x,y) = \int_0^1 t^{x-1} (1-t)^{y-1} dx \quad (5)$$

Both x and y are positive real numbers. The Beta function can also be expressed by means of Gamma functions:

$$B(x, y) = \frac{\Gamma(x)\Gamma(y)}{\Gamma(x+y)} \quad (6)$$

There is a special case when both parameters of the Beta function have the same value:

$$B(x, x) = \frac{\Gamma(x)\Gamma(x)}{\Gamma(x+x)} = \frac{\Gamma(x)^2}{\Gamma(2x)} \quad (7)$$

Using these definitions and that of Equation 2, the following relations can be derived:

$$\frac{B(x+1, x+1)}{B(x, x)} = \frac{x}{2(2x+1)} \quad (8)$$

and $$\frac{B(x+2, x)}{B(x, x)} = \frac{x+1}{2(2x+1)} \quad (9)$$

Another known property is:

$$B(x,x) = 2\ln(\Gamma(x)) - \ln(\Gamma(2x)) \quad (10)$$

Using the definition of the Digamma function, this results in:

$$\frac{d}{dx}\ln(B(x, x)) = 2\psi(x) - 2\psi(2x) \quad (11)$$

C. Beta Distribution

Let X be a random variable following a Beta distribution with parameters $\alpha$ and $\beta$:

$$X \sim \text{Beta}(\alpha, \beta) \quad (12)$$

The corresponding probability density function is given by:

$$p(x; \alpha, \beta) = \frac{1}{B(\alpha, \beta)} x^{\alpha-1}(1-x)^{\beta-1} \quad (13)$$

The following relations are known:

$$E[X] = \frac{\alpha}{\alpha + \beta} \quad (14)$$

and $$\text{Var}[X] = \frac{\alpha\beta}{(\alpha+\beta)^2(\alpha+\beta+1)} \quad (15)$$

Let X' be another random variable following a Beta distribution with parameters $\alpha'$ and $\beta'$:

$$X' \sim \text{Beta}(\alpha', \beta') \quad (16)$$

Then, the Kullback-Leibler divergence between the distribution of X and of X' is given by:

$$D_{KL}(X\|X') = \ln\left(\frac{B(\alpha', \beta')}{B(\alpha, \beta)}\right) + (\alpha - \alpha')\psi(\alpha) + (\beta - \beta')\psi(\alpha) + (\alpha - \alpha' + \beta - \beta')\psi(\alpha + \beta) \quad (17)$$

Notably, the Kullback-Leibler divergence produces a non-negative value that measures the difference between two probability distributions. Thus, $D_{KL}(X\|X')$ takes on a value of 0 when there is little or no difference between the distributions, and grows with the difference. But the Kullback-Leibler divergence is not symmetric, so $D_{KL}(X\|X')$ and $D_{KL}(X'\|X)$ can take on different values.

D. Symmetric Beta Distribution

The symmetric Beta distribution is a special case of the Beta distribution that was touched on above. Particularly, it is one in which $\alpha = \beta = \theta$. If $X_\theta$ is a random variable following the symmetric Beta distribution, then equations 14 and 15 provide:

$$E[X_\theta] = \frac{1}{2} \quad (18)$$

and $$\text{Var}[X_\theta] = \frac{1}{4(2\theta+1)} = \frac{1}{4} - \frac{\theta}{2(2\theta+1)} \quad (19)$$

Further, in view of equation 9, the second moment of $X_\theta$ is given by:

$$E[X_\theta^2] = \frac{\theta+1}{2(2\theta+1)} \quad (20)$$

If $X_{\theta'}$ is another random variable following the symmetric Beta distribution with parameter $\theta'$, the Kullback-Leibler (KL) divergence between the distribution of $X_\theta$ and of $X_{\theta'}$ is given by:

$$D_{KL}(X_\theta \| X_{\theta'}) = \ln\left(\frac{B(\theta', \theta')}{B(\theta, \theta)}\right) + 2(\theta - \theta')(\psi(\theta) - \psi(2\theta)) \quad (21)$$

E. The Beta Distribution as a Conditional Probability

Let:

$$Y|S \sim \text{Beta}(\kappa s, \kappa(1-s)) \quad (22)$$

Then, using equation 14:

$$E[Y|S] = \frac{\kappa s}{\kappa s + \kappa(1-s)} = s \quad (23)$$

Also, using equation 15:

$$\text{var}[Y|S] = \frac{s(1-s)}{\kappa+1} \quad (24)$$

Also, given that $S \sim \text{Beta}(s; \theta, \theta)$ and equation 8, the expected value of var[Y|S] with respect to $\theta$ that governs the properties of s is:

$$E[\text{var}[Y|S]] = \left(\frac{1}{\kappa+1}\right)\left(\frac{\theta}{2(2\theta+1)}\right) \quad (25)$$

F. Derivation of var[Y] Using the Law of Total Variance

As given above, the random variable Y is dependent on the random variable S, where S follows a symmetric Beta distribution. The Law of Total Variance states that:

$$\text{var}[Y] = E[\text{var}[Y|S]] + \text{var}[E[Y|S]] \quad (26)$$

Since E[var[Y|S]] is provided by equation 24, only the remaining term, var[E[Y|S]], needs to be determined. Thus:

$$\text{var}[E[Y|S]] = E[E[Y|S]^2] - E[E[Y|S]]^2 = E[S^2] - E[E[S]^2] \quad (27)$$

Incorporating equations 20 and 18, respectively:

$$\text{var}[E[Y|S]] = \frac{\theta+1}{2(2\theta+1)} - \frac{1}{4} \quad (28)$$

Therefore, after simplification:

$$\text{var}[Y] = \frac{1}{4} - \frac{\theta\kappa}{2(2\theta+1)(\kappa+1)} \quad (29)$$

G. Determining θ' as a Function of θ and κ

It is advantageous to be able to find θ' as a function of θ and κ by matching the variances of a target Beta distribution. The variance can be computed from the generative model:

$$p(y;\kappa,\theta') = \int_0^1 p(s|\theta)p(y|s;\kappa,\theta)ds \quad (30)$$

Given equations 19 and 29, the corresponding variances are:

$$\frac{1}{4} - \frac{\theta'}{2(2\theta'+1)} = \frac{1}{4} - \frac{\theta\kappa}{2(2\theta+1)(\kappa+1)} \quad (31)$$

After simplification:

$$\theta' = \frac{\theta\kappa}{2\theta+\kappa+1} \quad (32)$$

Furthermore, θ' and θ have the following relations. The derivative of θ' with respect to θ is:

$$\frac{d\theta'}{d\theta} = \frac{\kappa(\kappa+1)}{(2\theta+\kappa+1)^2} \quad (33)$$

The difference between θ and θ' is:

$$\theta - \theta' = \frac{2\theta^2 + \theta}{2\theta+\kappa+1} \quad (34)$$

The derivative of θ-θ' is:

$$\frac{d(\theta-\theta')}{d\theta} = \frac{4\theta^2 + 4\theta\kappa + 4\theta + \kappa + 1}{(2\theta+\kappa+1)^2} \quad (35)$$

H. Determining the Derivative of $D_{KL}(S\|Y)$ with Respect to θ

It is desirable to find a compact expression for the derivative of the KL-divergence between the distribution of S (a sigmoid signal as described below), and the distribution of Y (the output of the stochastic activation described below). Since both S and Y are random variables having symmetric Beta distributions with parameters θ and θ' respectively, then equation 21 can be rewritten as:

$$D_{KL}(S\|Y) = \ln(B(\theta',\theta')) - \ln(B(\theta,\theta)) + 2(\theta-\theta')(\psi(\theta) - \psi(2\theta)) \quad (36)$$

Taking the derivative of both sides with respect to θ results in three terms on the right. Using the chain rule, equation 11, and equation 33, the first is:

$$\frac{d\ln(B(\theta',\theta'))}{d\theta} = \frac{\kappa(\kappa+1)}{(2\theta+\kappa+1)^2} \cdot \left(\psi\left(\frac{\theta\kappa}{2\theta+\kappa+1}\right) - \psi\left(\frac{2\theta\kappa}{2\theta+\kappa+1}\right)\right) \quad (37)$$

In accordance with equation 11, the second term can be expressed as:

$$\frac{d\ln(B(\theta,\theta))}{d\theta} = 2\psi(\theta) - 2\psi(2\theta) \quad (38)$$

Using equation 34, equation 35, and equation 4, the third term is:

$$\frac{d[(\theta-\theta')(\psi(\theta)-\psi(2\theta))]}{d\theta} = \left(\frac{4\theta^2 + 4\theta\kappa + 4\theta + \kappa + 1}{(2\theta+\kappa+1)^2}\right)(\psi(\theta) - \psi(2\theta)) + \left(\frac{2\theta^2 + \theta}{2\theta+\kappa+1}\right)(\psi^{(1)}(\theta) - 2\psi^{(1)}(2\theta)) \quad (39)$$

Putting these three terms together and simplifying results in:

$$\frac{dD_{KL}(S\|Y)}{d\theta} = \frac{2\kappa(\kappa+1)}{(2\theta+\kappa+1)^2} \cdot \left[\left(\psi\left(\frac{\theta\kappa}{2\theta+\kappa+1}\right) - \psi\left(\frac{2\theta\kappa}{2\theta+\kappa+1}\right)\right) - (\psi(\theta) - \psi(2\theta))\right] + 2\left(\frac{2\theta^2 + \theta}{2\theta+\kappa+1}\right)(\psi^{(1)}(\theta) - 2\psi^{(1)}(2\theta)) \quad (40)$$

IV. NEURAL NETWORKS

In order to fully appreciate the embodiments herein, a basic background in machine learning, particularly neural networks, may be useful. A neural network (also referred to as an artificial neural network) is a computational model in which a number of simple units, working individually in parallel and without central control, combine to solve complex problems. While this model may resemble an animal's brain in some respects, analogies between neural networks and brains are tenuous at best. Modern neural networks often have a fixed structure, use a mathematical learning process, are trained to solve one class of problems at a time, and are much smaller than their biological counterparts.

A. Example Neural Networks

A neural network is represented as a number of nodes that are arranged into a number of layers, with connections between the nodes of adjacent layers. An example neural network 300 is shown in FIG. 3. Neural network 300 represents a feed-forward multilayer neural network, but similar structures and principles are used in convolutional neural networks, recurrent neural networks, adversarial neural networks, and recursive neural networks, for example.

Regardless, neural network 300 consists of four layers: input layer 304, hidden layer 306, hidden layer 308, and output layer 310. The three nodes of input layer 304 respectively receive $X_1$, $X_2$, and $X_3$ from initial input values 302. The two nodes of output layer 310 respectively produce $Y_1$ and $Y_2$ for final output values 312. Neural network 300 is a fully-connected network, in that nodes of each layer aside from input layer 304 receive input from all nodes in the previous layer.

The solid arrows between pairs of nodes represent connections through which intermediate values flow, and are each associated with a respective weight (e.g., any real number) that is applied to the respective intermediate value. Each node performs an operation on its input values and their associated weights to produce an output value. In some cases this operation may involve a dot-product sum of the products of each input value and associated weight. An activation function may be applied to the result of the dot-product sum to produce the output value. Other operations are possible.

For example, if a node receives input values $\{x_1, x_2, \ldots, x_n\}$ on n connections with respective weights of $\{w_1, w_2, \ldots, w_n\}$, the dot-product sum d may be determined as:

$$d = \sum_{i=1}^{n} x_i w_i + b \qquad (41)$$

Where b is a node-specific or layer-specific bias.

Notably, the fully-connected structure of neural network 300 can also be used to effectively represent a partially-connected neural network by giving one or more weights a value of 0. Similarly, the bias can also be set to 0 to eliminate the b term.

An activation function, such as the logistic function, may be used to map d to an output value z that is between 0 and 1, inclusive:

$$z = \frac{1}{1+e^{-d}} \qquad (42)$$

Functions other than the logistic function, such as tanh functions, may be used instead. These functions (logistic and tanh) are examples of a class of functions called sigmoids that are characterized by having an S-shaped curve and being differentiable. Thus, in the disclosure herein, the terms "sigmoid" and "sigmoid function" may refer to any functions of this class. Notable, the sigmoid activation "squishes" the output of a node into a real value in the range of 0 to 1 so that these outputs are easier to manipulate and represent.

In any event, the output (z in the example above) may be used on each of the node's output connections, and is modified by the respective weights thereof. Particularly, in neural network 300, input values and weights are applied to the nodes of each layer, from left to right until final output values 312 are produced. In order to obtain a meaningful, useful, and reasonably accurate solution, neural network 300 requires at least some extent of training. If neural network 300 has been fully trained, final output values 312 are a proposed solution to the problem that neural network 300 is intended to solve.

B. Training

Training a neural network usually involves providing the neural network with some form of supervisory training data, namely sets of input values and desired, or ground truth, output values. For neural network 300, this training data may include m sets of input values paired with output values. More formally, the training data may be represented as:

$$\{X_{1,i}, X_{2,i}, X_{3,i}, Y^*_{1,i}, Y^*_{2,i}\} \qquad (43)$$

Where $i=1 \ldots m$, and $Y^*_{1,i}$ and $Y^*_{2,i}$ are the desired output values for the input values of $X_{1,i}$, $X_{2,i}$, and $X_{3,i}$.

The training process involves applying the input values from such a set to neural network 300 and producing associated output values. A loss function is used to evaluate the error between the produced output values and the ground truth output values. This loss function may be a sum of absolute differences, mean squared error, or some other metric with non-negative value. In some cases, error values are determined for all of the m sets, and the error function involves calculating an aggregate (e.g., a sum or an average) of these values.

Once the error is determined, the weights on the connections are updated in an attempt to reduce the error. In simple terms, this update process should reward "good" weights and penalize "bad" weights. Thus, the updating should distribute the "blame" for the error through neural network 300 in a fashion that results in a lower error for future iterations of the training data.

The training process continues applying the training data to neural network 300 until the weights converge. Convergence occurs, for example, when the error is less than a threshold value, the change in the error is sufficiently small between consecutive iterations of training, a pre-determined maximum number of iterations is reached, or a pre-determined maximum amount of time has passed. At this point, neural network 300 is said to be "trained" and can be applied to new sets of input values in order to predict output values that are unknown.

Most training techniques for neural networks make use of some form of backpropagation. Backpropagation distributes the error one layer at a time, from right to left, through neural network 300. Thus, the weights of the connections between hidden layer 308 and output layer 310 are updated first, the weights of the connections between hidden layer 306 and hidden layer 308 are updated second, and so on. This updating is based on the derivative of the activation function.

Figure 4A:
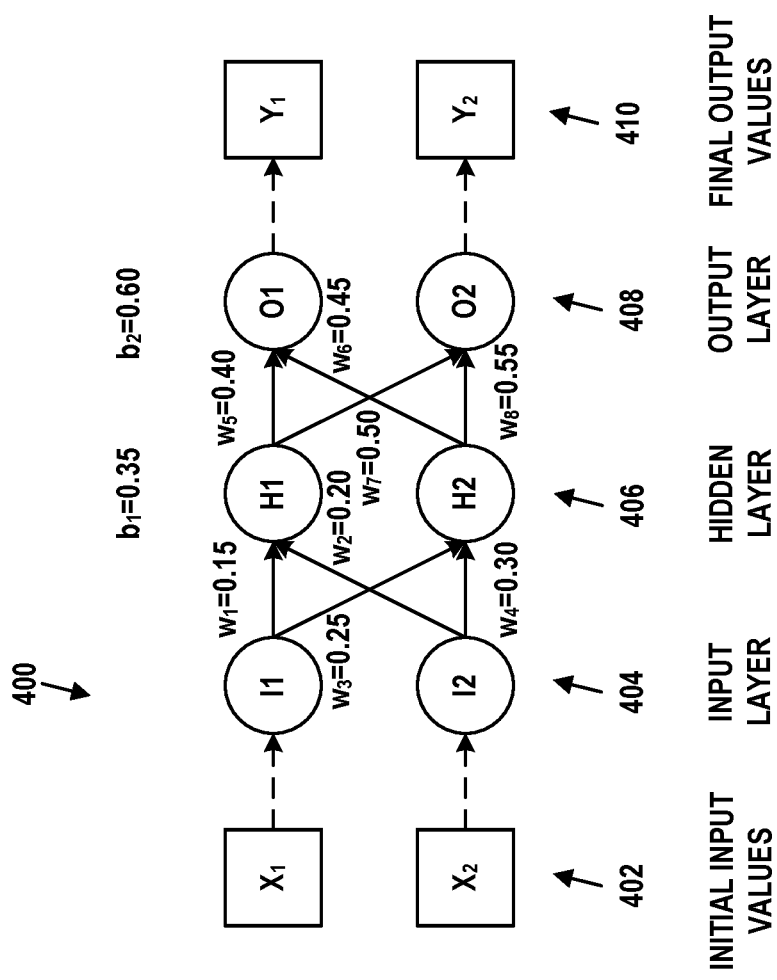
FIG. 4A depicts a neural network in the process of being trained, in accordance with example embodiments.

In order to further explain error determination and backpropagation, it is helpful to look at an example of the process in action. However, backpropagation becomes quite complex to represent except on the simplest of neural networks. Therefore, FIG. 4A introduces a very simple neural network 400 in order to provide an illustrative example of backpropagation.

Neural network 400 consists of three layers, input layer 404, hidden layer 406, and output layer 408, each having two nodes. Initial input values 402 are provided to input layer 404, and output layer 408 produces final output values 410. Weights have been assigned to each of the connections. Also, bias $b_1=0.35$ is applied to the net input of each node in hidden layer 406, and a bias $b_2=0.60$ is applied to the net input of each node in output layer 408. For clarity, Table 1 maps weights to pair of nodes with connections to which these weights apply. As an example, $w_2$ is applied to the connection between nodes I2 and H1, $w_7$ is applied to the connection between nodes H1 and O2, and so on.

TABLE 1

| Weight | Nodes |
|--------|-------|
| $w_1$ | I1, H1 |
| $w_2$ | I2, H1 |
| $w_3$ | I1, H2 |
| $w_4$ | I2, H2 |
| $w_5$ | H1, O1 |
| $w_6$ | H2, O1 |
| $w_7$ | H1, O2 |
| $w_8$ | H2, O2 |

For purpose of demonstration, initial input values are set to $X_1=0.05$ and $X_2=0.10$, and the desired output values are set to $Y^*_1=0.01$ and $Y^*_2=0.99$. Thus, the goal of training neural network 400 is to update the weights over some number of feed forward and backpropagation iterations until the final output values 410 are sufficiently close to $Y^*_1=0.01$ and $Y^*_2=0.99$ when $X_1=0.05$ and $X_2=0.10$. Note that use of a single set of training data effectively trains neural network 400 for just that set. If multiple sets of training data are used, neural network 400 will be trained in accordance with those sets as well.

1. Example Feed Forward Pass

To initiate the feed forward pass, net inputs to each of the nodes in hidden layer 406 are calculated. From the net inputs, the outputs of these nodes can be found by applying the activation function.

For node H1, the net input $net_{H1}$ is:

$$net_{H1} = w_1 X_1 + w_2 X_2 + b_1 \quad (44)$$
$$= (0.15)(0.05) + (0.20)(0.10) + 0.35 = 0.3775$$

Applying the activation function (here, the logistic function) to this input determines that the output of node H1, $out_{H1}$ is:

$$out_{H1} = \frac{1}{1 + e^{-net_{H1}}} \quad (45)$$
$$= 0.593269992$$

Following the same procedure for node H2, the output $out_{H2}$ is 0.596884378. The next step in the feed forward iteration is to perform the same calculations for the nodes of output layer 408. For example, net input to node O1, $net_{O1}$ is:

$$net_{O1} = w_5 out_{H1} + w_6 out_{H2} + b_2 \quad (46)$$
$$= (0.40)(0.593269992) + (0.45)(0.596884378) + 0.60$$
$$= 1.105905967$$

Thus, output for node O1, $out_{O1}$ is:

$$out_{O1} = \frac{1}{1 + e^{-net_{O1}}} \quad (47)$$
$$= 0.75136507$$

Following the same procedure for node O2, the output $out_{O2}$ is 0.772928465. At this point, the total error, $\Delta$, can be determined based on a loss function. In this case, the loss function can be the sum of the squared error for the nodes in output layer 408. In other words:

$$\Delta = \Delta_{O1} + \Delta_{O2} \quad (48)$$
$$= \frac{1}{2}(out_{O1} - \hat{Y}_1)^2 + \frac{1}{2}(out_{O2} - \hat{Y}_2)^2$$
$$= \frac{1}{2}(0.75136507 - 0.01)^2 + \frac{1}{2}(0.772928465 - 0.99)^2$$
$$= 0.274811083 + 0.023560026 = 0.298371109$$

The multiplicative constant ½ in each term is used to simplify differentiation during backpropagation. Since the overall result can be scaled by a learning rate $\alpha$ (see below), this constant does not negatively impact the training. Regardless, at this point, the feed forward iteration completes and backpropagation begins. In some embodiments, other types of loss functions may be used.

2. Backpropagation

As noted above, a goal of backpropagation is to use $\Delta$ to update the weights so that they contribute less error in future feed forward iterations. As an example, consider the weight $w_5$. The goal involves determining how much the change in $w_5$ affects $\Delta$. This can be expressed as the partial derivative $$\frac{d\Delta}{dw_5}.$$

Using the chain rule, this term can be expanded as:

$$\frac{d\Delta}{dw_5} = \frac{d\Delta}{dout_{O1}} \times \frac{dout_{O1}}{dnet_{O1}} \times \frac{dnet_{O1}}{dw_5} \quad (49)$$

Thus, the effect on $\Delta$ of change to $w_5$ is equivalent to the product of (i) the effect on $\Delta$ of change to $out_{O1}$, (ii) the effect on $out_{O1}$ of change to $net_{O1}$, and (iii) the effect on $net_{O1}$ of change to $w_5$. Each of these multiplicative terms can be determined independently. Intuitively, this process can be thought of as isolating the impact of $w_5$ on $net_{O1}$, the impact of $net_{O1}$ on $out_{O1}$, and the impact of $out_{O1}$ on $\Delta$.

Ultimately, $$\frac{d\Delta}{dw_5}$$

can be expressed as:

$$\frac{d\Delta}{dw_5} = (out_{O1} - \hat{Y}_1) out_{O1} (1 - out_{O1}) out_{H1} \quad (50)$$
$$= (0.74136507)(0.186815602)(0.593269992) = 0.082167041$$

Then, this value can be subtracted from $w_5$. Often a learning rate (e.g., a gain), $0 < \alpha \leq 1$, is applied to $$\frac{d\Delta}{dw_5}$$

to control how aggressively the neural network responds to errors. Assuming that α=0.5, the full expression is $$w_5 = w_5 - \alpha \frac{d\Delta}{dw_5}.$$

Similar equations can be derived for each of the other weights, $w_6$, $w_7$, and $w_8$ feeding into output layer 408. Each of these equations can be solved using the information above. The results are:

$$w_5=0.35891648$$

$$w_6=0.40866619$$

$$w_7=0.51130127$$

$$w_8=0.56137012 \quad (51)$$

Next, updates to the remaining weights, $w_1$, $w_2$, $w_3$, and $w_4$ are calculated. This involves continuing the backpropagation pass to hidden layer 406. Considering $w_1$ and using a similar derivation as above:

$$\frac{d\Delta}{dw_1} = \frac{d\Delta}{dout_{H1}} \times \frac{dout_{H1}}{dnet_{H1}} \times \frac{dnet_{H1}}{dw_1} \quad (52)$$

One difference, however, between the backpropagation techniques for output layer 408 and hidden layer 406 is that each node in hidden layer 406 contributes to the error of all nodes in output layer 408. Therefore:

$$\frac{d\Delta}{dout_{H1}} = \frac{d\Delta_{O1}}{dout_{H1}} + \frac{d\Delta_{O2}}{dout_{H1}} \quad (53)$$

Similar equations can be for each of the other weights, $w_2$, $w_3$, and $w_4$ feeding into hidden layer 406. Not unlike equation 49, each of these equations can be solved using the information above. The results are:

$$w_1=0.14978072$$

$$w_2=0.19956143$$

$$w_3=0.24975114$$

$$w_4=0.29950229 \quad (54)$$

Figure 4B:
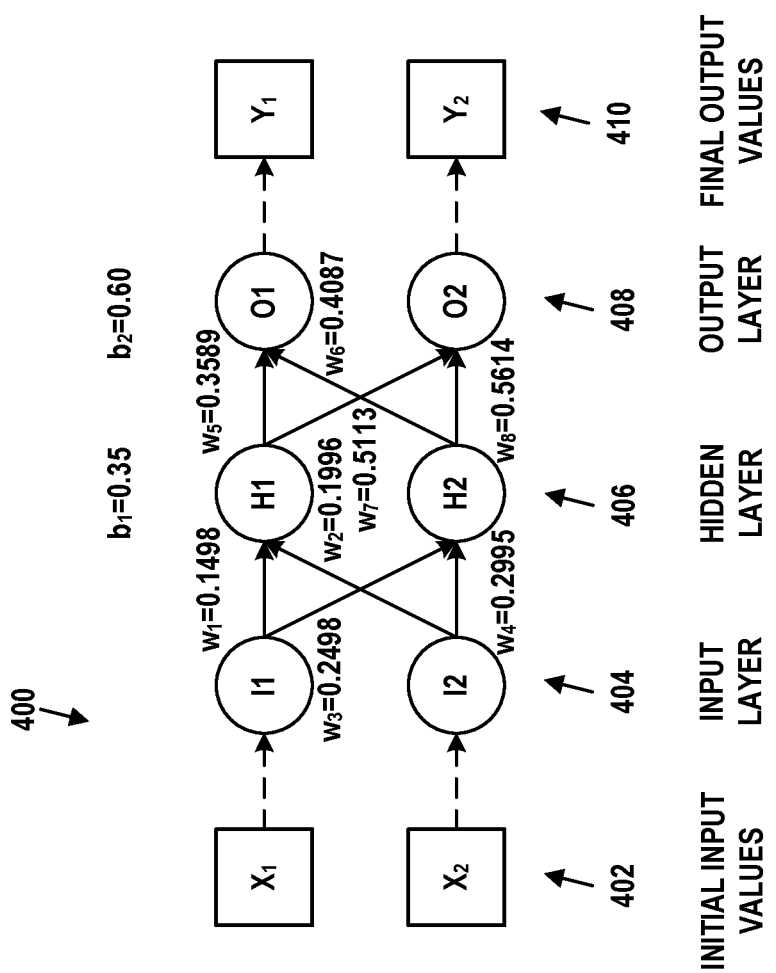
FIG. 4B depicts a neural network in the process of being trained, in accordance with example embodiments.

At this point, the backpropagation iteration is over, and all weights have been updated. FIG. 4B shows neural network 400 with these updated weights, values of which are rounded to four decimal places for sake of convenience. Neural network 400 may continue to be trained through subsequent feed forward and backpropagation iterations. For instance, the iteration carried out above reduces the total error, Δ, from 0.298371109 to 0.291027924. While this may seem like a small improvement, over several thousand feed forward and backpropagation iterations the error can be reduced to less than 0.0001. At that point, the values of $Y_1$ and $Y_2$ will be close to the target values of 0.01 and 0.99, respectively.

In some cases, an equivalent amount of training can be accomplished with fewer iterations if the hyperparameters of the system (e.g., the biases $b_1$ and $b_2$ and the learning rate α) are adjusted. For instance, the setting the learning rate closer to 1.0 may result in the error rate being reduced more rapidly. Additionally, the biases can be updated as part of the learning process in a similar fashion to how the weights are updated.

Regardless, neural network 400 is just a simplified example. Arbitrarily complex neural networks can be developed with the number of nodes in each of the input and output layers tuned to address specific problems or goals. Further, more than one hidden layer can be used and any number of nodes can be in each hidden layer.

V. BINARIZATION OF NEURAL NETWORK REPRESENTATIONS

A key to the success of neural networks has been a consistent increase in model capacity, defined either by the size of the architecture, e.g., number of hidden layers or hidden dimensions. While larger model capacity can lead to dramatic improvements in accuracy—especially when coupled with large amounts of training data—it has the disadvantage of requiring more compute resources, both during training but more critically when models are being provided and/or executed in some environment. Larger representations, more parameters and deeper architectures all require more computation (CPUs, GPUs, etc.). Larger representations and parameter spaces also require more memory, which can be critical when serving models in embedded environments such as mobile phones. Finally, larger representations, e.g., embedding loop-up tables or hidden layers, can further use storage space in situations such as retrieval, where these representations must persist. These observations have led to a motivation to make deep learning methods more computationally efficient, ideally with minimal or limited drops in quality.

The embodiments herein focus on an extreme case of compression—binarization of representations. Binarized representations—e.g., hidden layers or embedding look-up tables—can have many practical advantages. First, it offers the most aggressive form of quantization for model compression, which could lead to dramatically smaller representations being stored and processed. Second, binarized networks can be significantly faster. Third, it provides a hard assignment of hidden representations, which could make models more interpretable, e.g., via hard-attention mechanisms. Third, it is a natural way to make representations satisfy k-anonymity constraints in privacy-strict data environments, i.e., an N dimension binary representation makes the data 2N-anonymized. To this point, one could cast binarized neural representations as k-anonymized neural networks.

The following disclosure involves techniques for binarizing representations in neural network models via stochastic Beta activation functions. These are stochastic nodes that add noise to the output of sigmoid-based representations via sampling from a specialized Beta-distribution during training of the network. These techniques exhibit a number of theoretical properties and corresponding empirical behavior that can provide advantageous. Specifically, under particular assumptions, neural network models can learn binarized representations. The empirical studies establish that binarization happens in practice.

Formally, let $R_S=(s_1, s_2, \ldots, s_D)$ be a representation of a dimension D (e.g., a hidden layer of a neural network) that is to be binarized, where $s_i$ is the value in dimension i of that representation. $R_S$ may be obtained from a previous representation $R_X$ through sigmoid activations. As a result, $0 \leq s_i \leq 1$ for $1 \leq i \leq D$. Let $y_i$ be a sample drawn from a Beta distribution $B(\alpha_i, \beta_i)$ parameterized as a function of $s_i$ such that $\alpha_i = \kappa s_i$ and $\beta_i = \kappa(1-s_i)$. Thus, $y_i$ is sampled as:

$$y_i \sim \text{Beta}(\kappa s_i, \kappa(1-s_i)) \tag{55}$$

The hyper-parameter $\kappa$ can be referred to as "conductance" and is a positive real number. This sampling of $y_i$ is visually represented in diagram 500 of FIG. 5.

Figure 5:
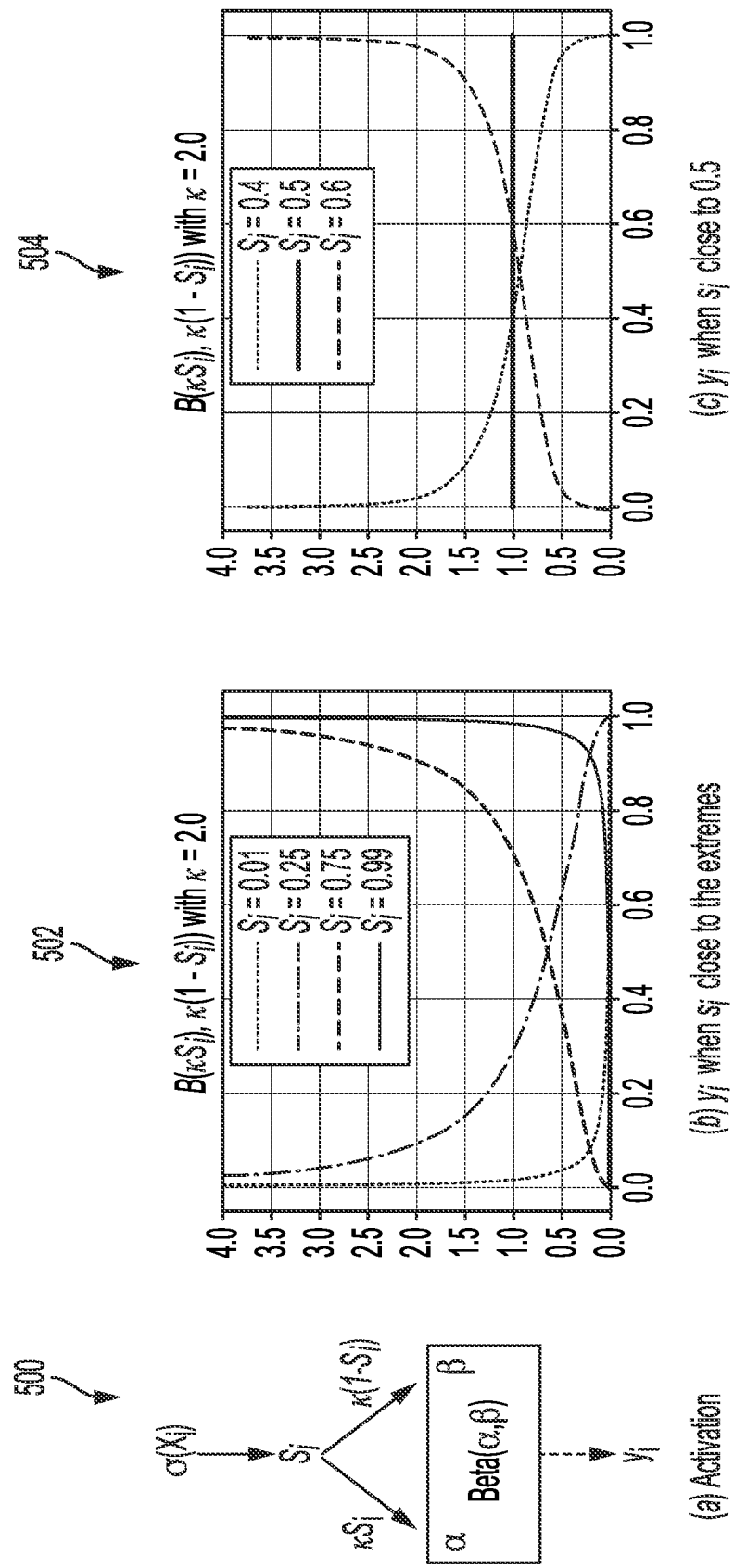
FIG. 5 depicts a stochastic activation function using a Beta distribution as well as plotted values thereof, in accordance with example embodiments.

Since the support of a Beta distribution is the interval of 0 to 1, $s_i$ and $y_i$ have the same support. Notably, under the above parameterization, the compound system will operate as an information filter, allowing only certain values of $s_i$ to be reliably passed via $y_i$ to downstream layers. In fact, when $s_i$ is close to either 0 or 1, $y_i$ will "follow" it with a probability close to 1. As an example of this, diagram 502 of FIG. 5 plots the probability density function of $y_i|s_i$ for cases where $s_i$ is close to 0 and 1. However, if $s_i$ is close to 0.5, the Beta distribution will be parameterized in a way that its mass is spread over the entire support, leading to $y_i$ becoming virtually uncorrelated with $s_i$. As an example, diagram 504 of FIG. 5 plots the probability density function of $y_i|s_i$ for cases where $s_i$ is close to 0.5. Let $R_Y = (y, y_2, \ldots, y_D)$ be the corresponding representation produced from this stochastic Beta activation node.

Let S denote the random variable that describes the output of the sigmoid (refer again to diagram 500 of FIG. 5), and s denote a specific sample (for the sake of simplicity the subscript is dropped since a single sample corresponding to one of the dimensions of the representation is being modelled). Likewise, let Y denote the random variable that describes the final output of the stochastic activation. The KL-divergence between Y and S is given by:

$$D_{KL}(S\|Y) = \int_{-\infty}^{\infty} p_s(S=x)\log\left(\frac{p_s(S=x)}{p_s(Y=x)}\right)dx \tag{56}$$

One of the main premises of the techniques herein is that $D_{KL}(S\|Y)$ reaches a minimum when S is a Bernoulli random variable—in other words, when the values of $s_i$ are binary. Based on the understanding that optimizing a neural network maximizes the mutual information between layers with respect to the output, then the following statement is true.

If minimizing the global loss function of a neural network implies faithfully passing information carried by representation $R_S$ to $R_Y$, then the optimization of the neural network will push $D_{KL}(S\|Y)$ to a minimum, forcing $R_S$ to binarize.

In order to show this, a probabilistic model for the stochastic activation function is developed. The probability density functions of the random variables S and Y are obtained, corresponding to the output of the intermediate sigmoid and the final output of stochastic activation, respectively. These functions will have parameters that allow controlling how close the variables are to binary. Using the derived probability density functions, an expression of $D_{KL}(S\|Y)$ is obtained that proves $D_{KL}(S\|Y)$ reaches a minimum when the values of $s_i$ are binary. An empirical analysis illustrates how this activation function behaves in practice, in terms of binarization properties relative to hyper-parameters (namely $\kappa$) as well as the accuracy versus representational fidelity trade-off.

A. Modeling the Stochastic Activation Function

This subsection provides derivations for both $p_s(S=s)$ and $p_s(Y=y)$, as well as an expression for $D_{KL}(S\|Y)$.

1. Model for the Output of the Sigmoid Activation

Since the co-domain of the sigmoid function is the open interval (0, 1), a model of the output of the sigmoid activation can be a Beta distribution from which samples are drawn. Here, a simplifying assumption that the output of the sigmoid is not biased towards any of the extremes is made. Thus, it can be modeled as a symmetric Beta distribution parameterized by $\theta$:

$$p(s|\theta) = \text{Beta}(s; \theta, \theta) = \frac{s^{\theta-1}(1-s)^{\theta-1}}{B(\theta, \theta)} \tag{57}$$

For such a distribution, the expected value and variance are given by equation 18 and equation 19, respectively. The parameter $\theta$ is enough to allow modeling of different types of signals being produced by the sigmoid function. If $\theta=1$, then s follows a uniform distribution Beta(s; 1,1)=Uniform (0,1), which means that s uses equally the full range of output values. On the other hand, the lower the $\theta$, the more mass is pushed the extremes of the support of the distribution. As $\theta \to 0$, the $p(s|\theta)$ distribution will degenerate in a Bernoulli (discrete) distribution. In practice, this is equivalent to saying that s has become a binary code.

2. Model of the Conditional $p(y|s; \kappa)$

As mentioned before, the output y of the stochastic activation results from sampling a Beta function parameterized as function of the value of the sigmoid. More specifically:

$$Y|S \sim \text{Beta}(\kappa s, \kappa(1-s)) = \frac{y^{\kappa s - 1}(1-y)^{\kappa(1-s)-1}}{B(\kappa s, \kappa(1-s))} \tag{58}$$

It can be formally shown that y stochastically follows s, and that it is a more reliable image of s as s gets closer to the extremes. According to equation 23, E[Y|S]=s. Thus, y follows s in expectation, but the tightness of this expectation is also important.

From equation 24, the variance of Y|S is $$\frac{s(1-s)}{\kappa+1},$$

which is low when s gets close to the extremes or when $\kappa$ get large. This makes the role of the conductance parameter clearer. Also, s can be marginalized from the above equation to obtain an expectation of the above variance with respect to the parameter $\theta$ that governs the properties of s.

From equation 25, the expected value of this variance is $$\left(\frac{1}{\kappa+1}\right)\left(\frac{\theta}{2(2\theta+1)}\right).$$

This expression shows that the variance of Y|S will be smaller as $\theta$ gets smaller and the mass of $p(s|\theta)$ gets pushed to the extremes. In the limit, when S degenerates to a Bernoulli distribution, the above expectation will be zero, meaning that y is an exact replica of s. In other words, y will be a more reliable copy of s as s becomes closer to being a binary code.

3. Model of the Output of the Stochastic Activation $p(y; \kappa, \theta)$

Given that the distribution of S has probability density function (PDF) $p(s|\theta)$, and that the conditional distribution of Y given S has PDF $p(y|s; \kappa)$, the joint PDF is then:

$$p(y, s; \kappa, \theta) = p(y|s; \kappa) \cdot p(s|\theta) = \frac{y^{\kappa s - 1}(1-y)^{\kappa(1-s)-1}}{B(\kappa s, \kappa(1-s))} \cdot \frac{s^{\theta-1}(1-s)^{\theta-1}}{B(\theta, \theta)} \quad (59)$$

The PDF above is the product of two Beta variables. While there are compact expressions for the product of two independent Beta variables, the two variables above are dependent. So the extended form above is manipulated directly.

Notably, the distribution $p(y; \kappa, \theta)$ can be found by marginalizing s (via integration) from equation 59:

$$p(y; \kappa, \theta) = \int_0^1 p(y, s; \kappa, \theta) ds = \frac{1}{B(\theta, \theta)} \int_0^1 \frac{y^{\kappa s - 1}(1-y)^{\kappa(1-s)-1}}{B(\kappa s, \kappa(1-s))} \cdot s^{\theta-1}(1-s)^{\theta-1} ds \quad (60)$$

However, the integral above appears to have no closed form solution. An alternative way of finding a usable expression for $p(y; \kappa, \theta)$ consists of hypothesizing about the family of distributions that could approximate the true distribution, and then trying to determine the values of the corresponding parameters, as function of $\kappa$ and $\theta$, that would provide the best fit for the true marginal. For finding a potential family of distributions for $p(b; \kappa, \theta)$, one has to restrict the set of candidate families to those that are consistent with the known and expected properties of $p(y; \kappa, \theta)$. More specifically, the candidate family should allow for distributions with support over the interval (0,1) and which are symmetric around ½. This is because $p(s, \theta)$ is symmetric around $s=½$ and the conditional distribution $p(y|s; \kappa)$ is constructed in a way that gives equal probability to values of s equidistant from $s=½$, i.e., $p(y|s; \kappa, \theta)=p(y|1-s; \kappa, \theta)$. Also, this family should allow for distributions that degenerate into a Bernoulli distribution as $\theta$ tends to zero. By design, $p(y|s; \kappa, \theta)$ will push all its mass to one of the extremes as $\theta$ approaches zero.

Ideally, such family would also allow for distributions that are continuous and smooth inside their support except in the limit where they degenerate to a Bernoulli distribution. Naturally, one family of distributions that can satisfy all these constrains is the Beta itself. Therefore, it is reasonable to adopt the approximation that Y ~Beta($\theta'$, $\theta'$), where $\theta'$ is the only parameter needed (due to symmetry) and functions as both $\theta$ and $\kappa$.

To determine $\theta'$, it is helpful to consider the variance of Y, which follows the symmetric Beta distribution. Thus, this variance is given by equation 19. On the other hand, the same variance can be computed by a generative process where Y is generated conditioned on S. Because of this dependency, the variance of Y can be obtained from the Law of Total Variance, as introduced in equation 29. In accordance with equation 32, $\theta'$ can be expressed as a function of $\theta$ and $\kappa$. With this understanding, an approximation for the true marginal is:

$$p(y; \kappa, \theta) = \text{Beta}\left(\frac{\theta\kappa}{2\theta + \kappa + 1}, \frac{\theta\kappa}{2\theta + \kappa + 1}\right) \quad (61)$$

Figure 6:
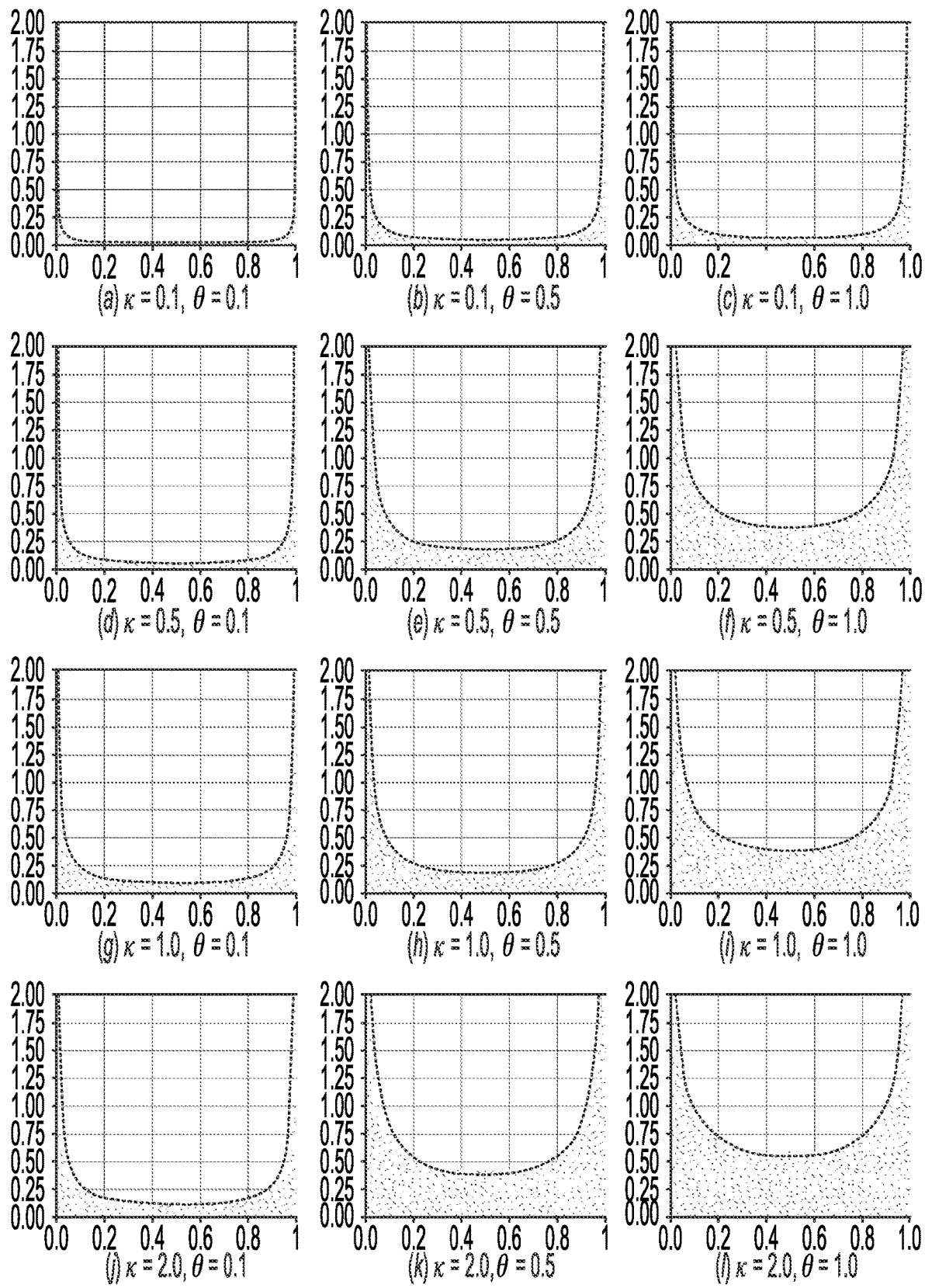
FIG. 6 depicts plots of the output of the stochastic activation function versus a symmetric Beta distribution with various parameters, in accordance with example embodiments.

Numerical evidence suggests that equation 61 is indeed a good approximation for the true expression of $p(y, s; \kappa, \theta)$, at least for values of $\kappa \leq 1$. To that point, FIG. 6 depicts a number of graphs 600 establishing that this is the case.

Graphs 600 include plots of the histogram of the empirical distribution of the output of the stochastic activation (shaded) and of the closed form approximation to $p(y; \kappa, \theta)$ based on a symmetric Beta distribution for various values of $\theta$ and $\kappa$. As noted previously, $\theta$ governs the shape of the distribution of values coming from the sigmoid function, and $\kappa$ is the conductance related with the parameterization of the conditional distribution.

In can be seen from graphs 600, that the approximation via Beta distribution fits the empirical distribution quite well. For values of $\kappa$ between 0.1 and 1, the fit is very tight. For values of $\kappa>2$, there is a slight divergence between the two distributions. Still, the variance of the empirical distributions always matches the variance of the corresponding PDF approximation, as ensured by design and verified in practice. It is, however, important to realize that values of $\kappa$ are supposed be small by design, typically below 2, so the observed divergence should not fundamentally change the theoretical analysis and practical validation. Further, the expression in equation 61 satisfies the asymptotic requirements listed above, especially the one concerning the degeneration into a Bernoulli distribution as $\theta \to 0$.

B. The Expression for $D_{KL}(S\|Y)$ and its Minimum

In the previous section, a probabilistic model of the stochastic activation function was developed, and it was shown that the stochastic behavior of entire the system can be described by PDFs governed by two parameters only: the conductance, $\kappa$, and parameter $\theta$ that controls the shape of the sigmoid output. This section further establishes that the KL-divergence between S and Y, $D_{KL}(S\|Y)$, reaches its minimum when $\theta$ tends to 0, that is, when its S has been binarized. Since S and Y are two symmetric Beta distributions governed by the parameters $\theta$ and $\theta'$ respectively, the KL-divergence shown in equation 21, in view of the properties of equations 32 and 34, is given by:

$$D_{KL}(S\|Y) = \ln\left(\frac{B(\theta', \theta')}{B(\theta, \theta)}\right) + 2(\theta - \theta')(\psi(\theta) - \psi(2\theta)) = \quad (62)$$
$$\ln\left(B\left(\frac{\theta\kappa}{2\theta + \kappa + 1}, \frac{\theta\kappa}{2\theta + \kappa + 1}\right)\right) -$$
$$\ln(B(\theta, \theta)) + 2\left(\frac{2\theta^2 + \theta}{2\theta + \kappa + 1}\right)(\psi(\theta) - \psi(2\theta))$$

Figure 7:
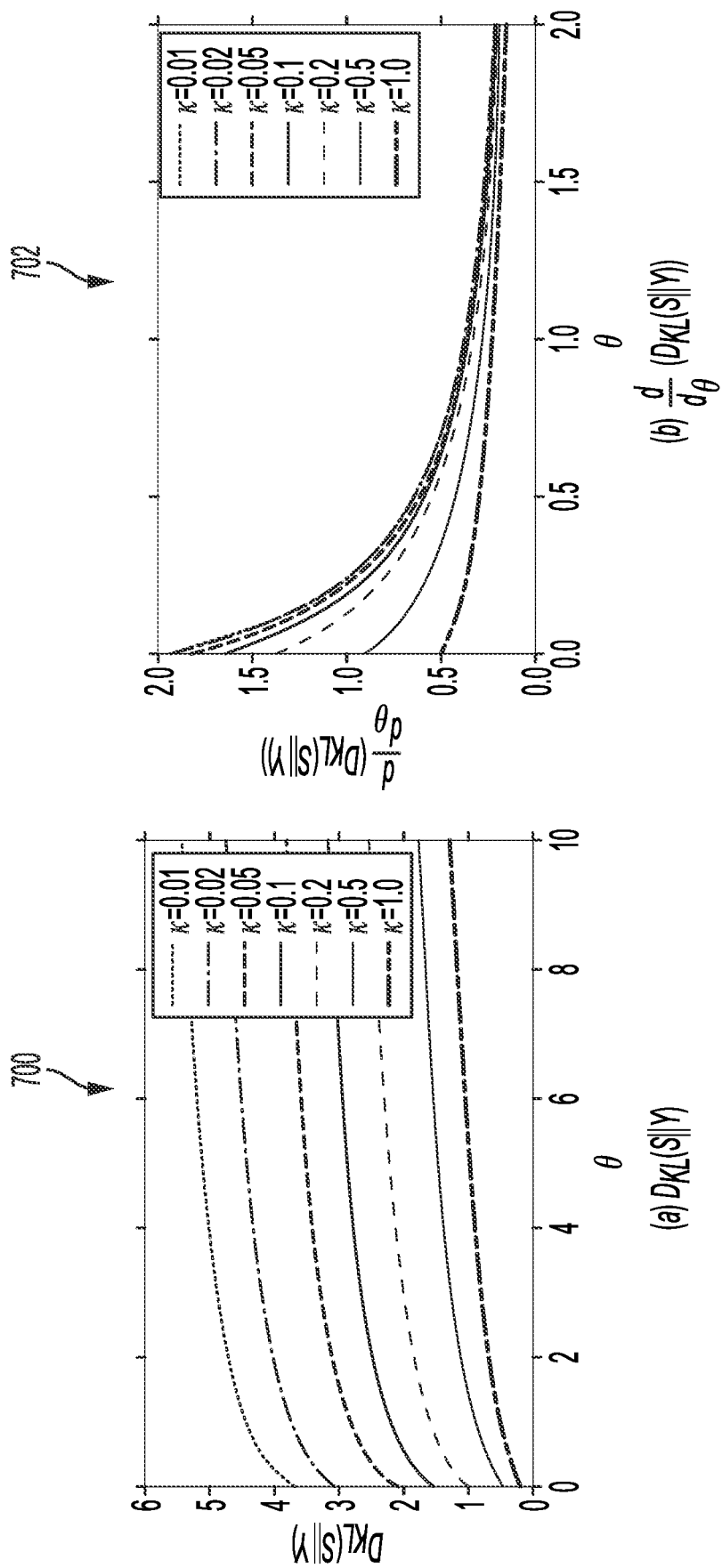
FIG. 7 depicts the Kullback-Leibler divergence of the sigmoid activation and the stochastic activation, as well as the derivative thereof, in accordance with example embodiments.

Despite its apparent complexity, the above equation 62 can be easily plotted. FIG. 7 shows plot 700 of $D_{KL}(S\|Y)$ curves for several values of the conductance parameter $\kappa$, and for $0 \leq \theta \leq 10$. From the plots, it is apparent that the value of $D_{KL}(S\|Y)$ reaches a minimum for $\theta=0$, for all values of $\kappa$ within the range under consideration. Further, the lower the conductance $\kappa$ the higher the divergence between S and Y. As shown in Equation 29, lower values of conductance lead to higher variances of the output signal for the same value of $\theta$, which implies that more information from S is being lost, and the distributions diverge.

It can be further shown that within the same range of values of $\kappa$, for $\theta>0$, then $$\frac{dD_{KL}(S\|Y)}{d\theta} > 0.$$

This is equivalent to saying that $D_{KL}(S\|Y)$ reaches its minimum at $\theta=0$. It is not trivial to formally prove that such derivative is always positive for $\theta>0$, its value can be plotted for reasonable ranges of θ and κ. Plot 702 shows that the value of the derivative of $D_{KL}(S\|Y)$ is, in fact, positive for all values of θ and κ considered. Therefore, the KL-divergence has its minimum when θ=0. This proves the main premise above—that $D_{KL}(S\|Y)$ reaches a minimum when S is a Bernoulli random variable—in other words, when the values of $s_i$ are binary. Therefore, in scenarios where the information that is carried in each dimension of the representation needs to be fully preserved, the optimizer should attempt to minimize $D_{KL}(S\|Y)$, and this is achieved by driving the network to producing binary representations at the output of the sigmoid, without the need for applying any form of regularization to achieve that binarization goal.

C. Experimental Validation

This section experimentally demonstrates two points. First, the proposed stochastic activation behaves consistently with the theoretical model developed previously. More specifically, the output of the sigmoid (modeled by S) will be pushed to the extremes as the training proceeds, and that the output of the stochastic activation (modeled by Y) will become even more extreme. This will force the downstream layers of the model to learn how to deal with representations that are increasingly closer to being binarized, thus becoming capable of dealing with fully binarized representations at inference time.

Second, the impact of using the stochastic activation function is illustrated in a practical scenario: sentence autoencoding. Auto-encoding is an appropriate setting for this testing because it is an information-hungry task. More specifically, the stochastic activation function can be used to train a sentence encoder capable of producing binary sentence representations at inference time, while still achieving competitive reconstruction accuracy. The performance obtained with the same auto-encoder architecture (i) using continuous sentence representation, (ii) using representations quantized to 8 bits at inference time and (iii) using representations binarized at inference time. It will be shown that the techniques herein provide better performance than alternatives under constrained bit-rate scenarios.

1. Experimental Setting

Let $x_i=[t_1, t_2, \ldots, t_m]$ be a sentence with up to m tokens. An encoder model E can be used to obtain a sentence representation $e_i=E(x_i)$. This sentence representation can be further manipulated by a transcoder, T, to obtain an additional intermediate representation $t_i=T(e_i)$. This intermediate representation is passed to a decoder D that reconstructs a list of tokens, such that $\hat{x}_i=D(t_i)=[\hat{t}_1, \hat{t}_2, \ldots, \hat{t}_m]$.

Different transcoder configurations can be compared while maintaining the rest of the components of the auto-encoder fixed. The baseline transcoder, $T_o$, consists of a dense layer followed by a sigmoid activation. It is trained in the traditional way. At inference, representations can be passed downstream at full precision (32 bits), or quantized to 8 bits or to 1 bit (by thresholding).

On the other hand, transcoder $T_β$ will use the stochastic activation function proposed above. At training time it consists of sigmoid activation that parameterizes the Beta distribution from which samples are drawn. At inference time, this transcoder will be the same sigmoid activation followed by a thresholding operation (at 0.5) that binarizes the representation to be passed to the decoder. The implementation of Beta-distributed stochastic node is provided by the Tensorflow Probability software package, which allows passing gradients.

These components are combined to form an auto-encoder. In neural networks, an auto-encoder is an encoder, followed by at least one hidden layer, followed by a decoder. When trained properly, it can learn efficient encodings of input data in an unsupervised manner by representing the "signal" of the input in a hidden layer while ignoring the "noise" of the input. As a result of this training, $\hat{x}_i$ should approximate $x_i$ within some amount of (ideally low) error.

The remaining components of the auto-encoder model are as follows. On the encoder side, an embedding layer is first used to convert each token of the sequence, encoded as a 1-hot vector, in a sequence of dense representations. This sequence is then passed to a bidirectional long-term short memory (LSTM) network to produce a single d-dimensional representation of the sentence. The LSTM is helpful in identifying long-term dependencies in the input. This can be thought of as projecting the sentence into a d-dimensional semantic space, where the representation encodes the semantic "meaning" of the sentence as a vector.

As mentioned above, one of the two transcoders under comparison are applied, and the resulting representation is passed to the decoder. The decoder consists of a bidirectional LSTM whose left and right output are merged for each token. The resulting sequence of token-level representations is fed to a projection matrix that maps them back to the token domain via a softmax operation. To reduce memory footprint, the projection matrix is the transpose of the embedding matrix used in the encoder.

In all of the experiments, the same publicly available text data is used. Sentences were extracted from biographical articles collected from Wikipedia. From those, only sentences of length between 8 and 20 tokens were selected, where all tokens belong to a vocabulary of $2^{15}$=32768 tokens. The vocabulary was also generated from the same Wikipedia articles. This means that we are out-of-vocabulary words are not used (though not all tokens in the test set are guaranteed be present in the training set). Overall, about half a million sentences (508359) were used for training and testing, 90% of which are used for training and the remaining 10% for testing. All models were trained for 250 epochs, with batches of size 128.

Notably, these experimental parameters and the overall design was chosen to validate the premises herein, as well as to show agreement between theory and implementation. Other types of neural networks, input data, amount of input data, training/testing data split, and numbers of training epochs can be used, for example.

2. Behavior while Training

Figure 8:
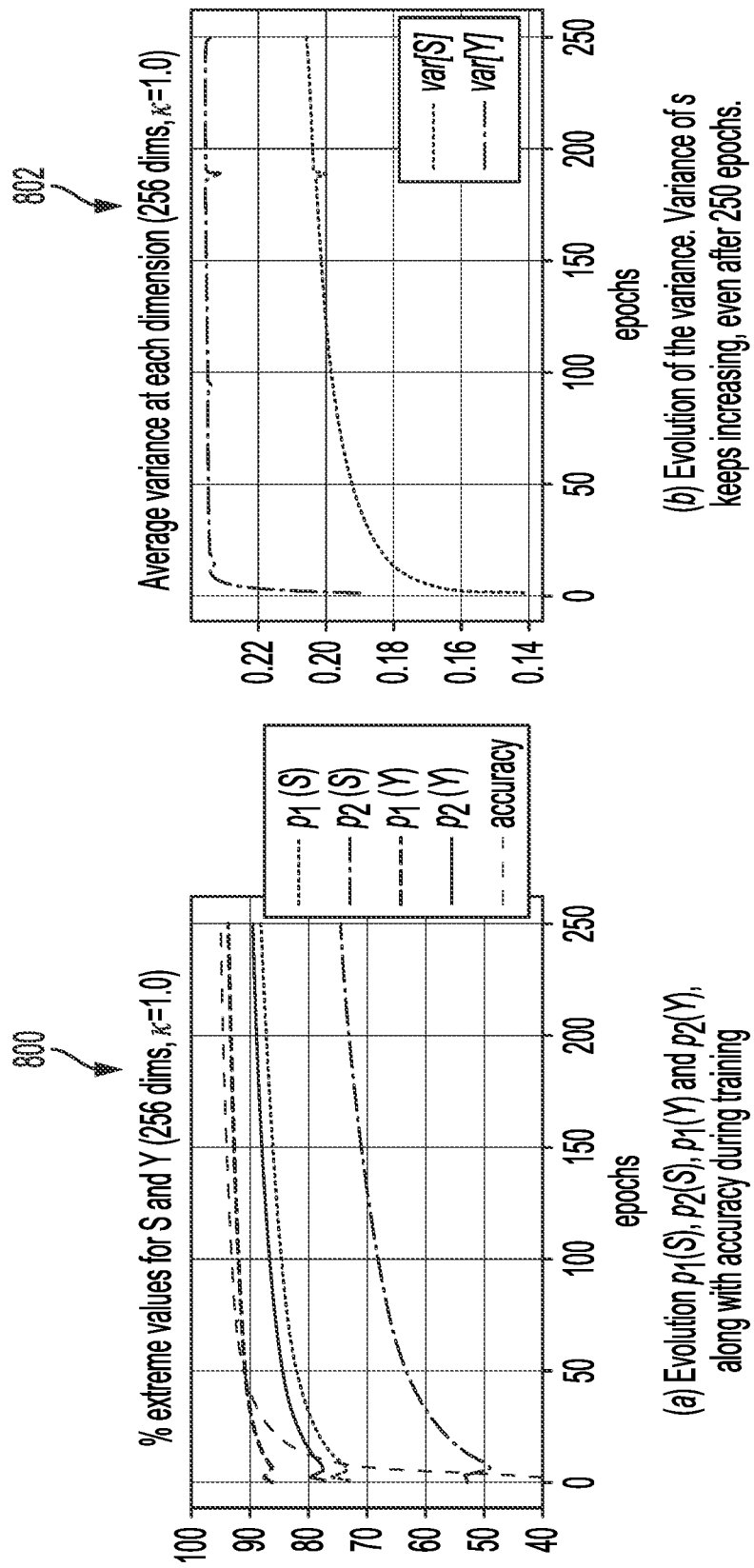
FIG. 8 depicts how values of the sigmoid activation and the stochastic activation are pushed to extreme values during training, in accordance with example embodiments.

According to the model of the stochastic activation we proposed, during training the neural network should evolve in a way that will consistently push the output of the sigmoid activation to the extremes. To measure that, the statistic $p_n$, represents the percentage of cases where the value of a certain quantity falls below $10^{-n}$ or is above $1-10^{-n}$, i.e., is extreme. Plot 800 of FIG. 8 the shows evolution of $p_1(S)$, $p_2(S)$, $p_1(Y)$, and $p_2(Y)$, along with the value of reconstruction accuracy, while training the sentence encoder model with the $T_β$ transcoder over 250 epochs. For this example, the transcoder was configured to produce sentence embeddings of dimension 256, and operate with conductance parameter κ=1.0.

As shown, both S and Y are being pushed to the extremes as the training process evolves. As predicted, the values of Y are more extreme than those of S, as that is clear from the evolution of variance shown in plot 802. In fact, the output of the stochastic activation y seems to become almost completely binarized after 5-10 epochs (but not necessarily yet "locked" to the value of the sigmoid s) while the latter keeps being consistently pushed more and more to the extremes over the entire training process.

Figure 9:
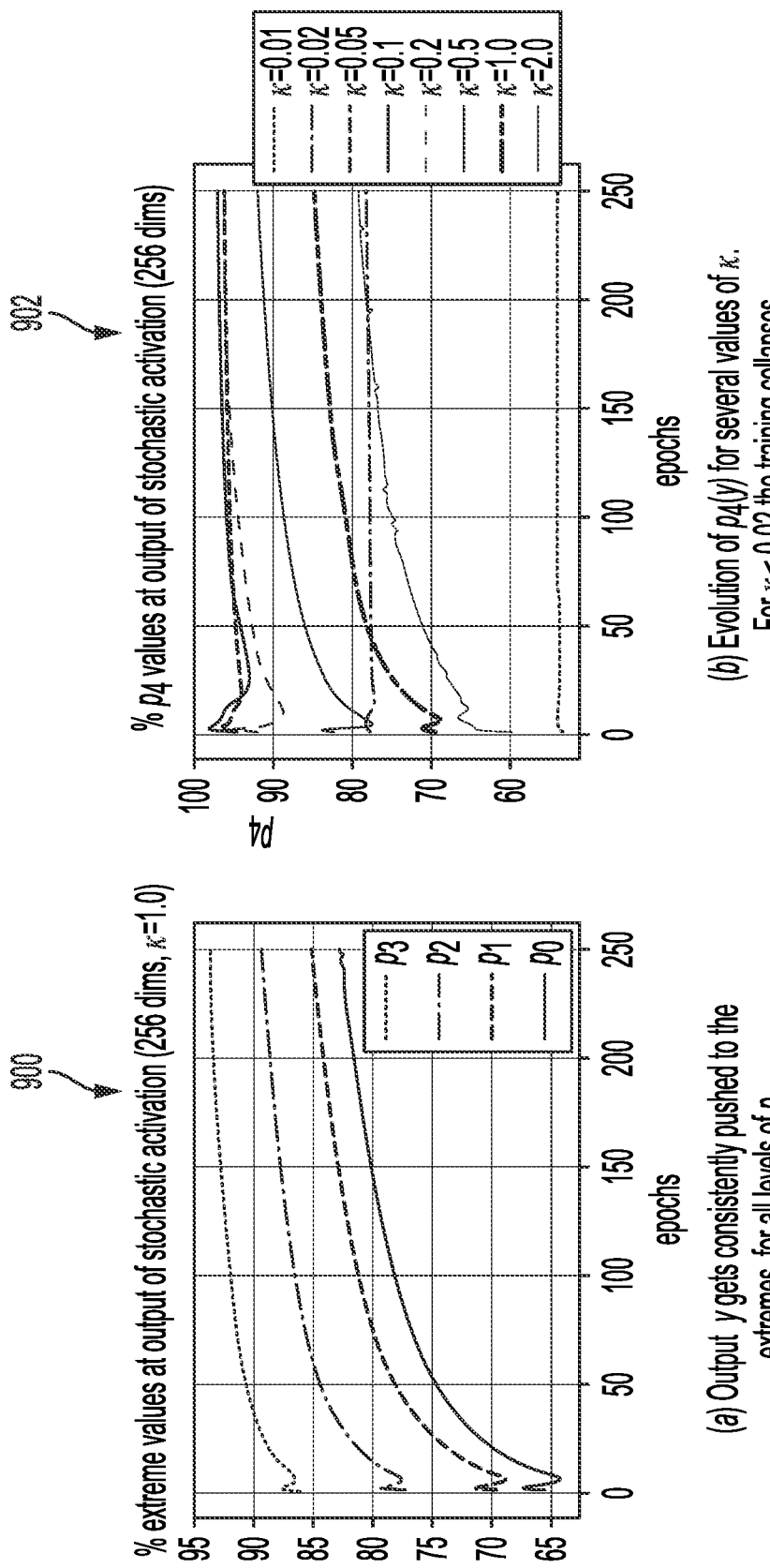
FIG. 9 depicts how far outputs of the stochastic activation are pushed to extreme values during training, in accordance with example embodiments.

Interestingly, the value of var[Y] does not converge to 0.25 which would correspond to that of a symmetric Beta distribution. As a matter of fact, Y seems to have in practice a small preference for producing values closer to zero. This results in values of var[Y] slightly lower than 0.25. In the example above, at epoch 250, E[S]=0.4804 and E[Y] =0.4804. Plot 900 of FIG. 9 details how the output of the stochastic activation is pushed to the extremes at different levels of $p_n$. Notably, $p_n(y)$ surpasses 80% for $\kappa=1.0$. Plot 902 shows that this figure can be pushed even higher if $\kappa$ is decreased. This is consistent with the model above, as lower values of conductance should lead the conditional distribution Y|S being pushed more to the extremes. However, when the value of $\kappa$ goes below 0.02, the entire training procedure seems to collapse. This may be related to difficulties in sampling and propagating gradients when the $\alpha$ and $\beta$ parameters of the Beta distribution get extremely small. In practice, values of $\kappa$ lower than 0.1 seem render the training process ineffective.

3. Comparison with Baseline Model for the Auto-Encoding Task

Table 1000 of FIG. 10 provides a side-by-side comparison of performance for sentence embeddings of dimension 64 to 896. For $T_\sigma$, 8-bit and 1-bit quantization is executed at inference time. Here, $\Delta$ compares performance obtained with $T_\beta$ versus $T_\sigma$ at full precision. Models compared in each line have the same number of parameters.

In other words, Table 1000 compares the auto-encoding reconstruction accuracy obtained using $T_\beta$ against that obtained using the baseline transcoder $T_\sigma$. At inference time, $T_\sigma$ operates under three different configurations with respect to the representation being passed downstream: (i) 32-bits/full-precision, (ii) 8-bit quantization, or (iii) 1-bit quantization/binarization. Side-by-side configurations are placed corresponding to sentence embedding with the same number of dimensions, so that apart from the transcoder, all the other components of neural network have exactly the same number of parameters. For $T_\beta$ the results for the best value of $\kappa$ (always between 0.1 and 2) are shown.

As expected, the larger the dimension of the embedding, the better is the reconstruction accuracy. When using full precision, the ceiling for the task is about 97-98% accuracy with about 128 dimensions. Notably, setting $T_\sigma$ to execute 8-bit quantization at inference time leads to only minor drop in performance (about 1%). However, if the original full-precision representation is binarized, performance drops dramatically, sometimes to below levels of 1%. On the other hand, using $T_\beta$ to induce binary representation results in accuracies that despite being lower, become comparable to those of the 8-bit and 32-bit configurations for embedding of sizes around 512 dimensions, while still allowing for compression rates of 8:1 or 32:1.

Figure 11:
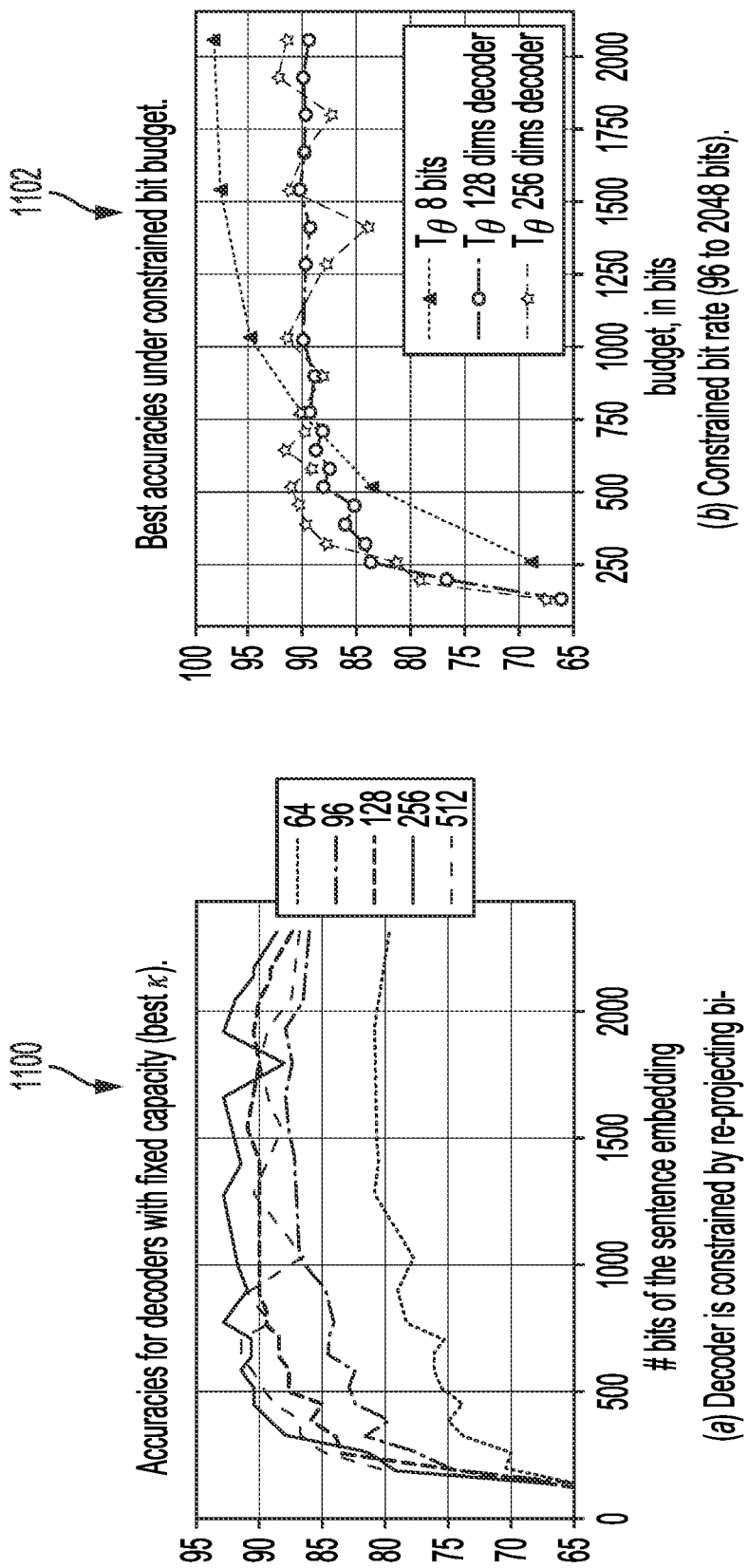
FIG. 11 depicts memory efficiency of the neural network trained using the stochastic activation, in accordance with example embodiments.

Plot 1100 of FIG. 11 shows the values of reconstruction accuracy obtained while keeping the complexity of the decoder constant. Independently of the dimensionality of the binarized embedding, that embedding is linearly projected to a representation of 64, 96, 128, 256 or 512 dimensions, which is then passed to a decoder configured for representations of that size. This experiment assesses the relative importance of the capacity of the decoder in the final performance. As shown, low capacity decoders (64, 96 dimensions) lead to sub-optimal performance, but there seems to be no benefit in using decoders with more than 256 dimensions. It is also apparent that there is no gain in performance in using sentence embeddings with more than 1024 bits (prior to the projection). The combinations of these two facts suggests that the bottleneck may actually be in the encoder, that is not powerful enough encode all information in a binarized representation.

Finally, the accuracies of using $T_\beta$ and $T_\sigma$ under a constrained bit-rate are obtained. Plot 1102 shows the accuracy obtained as a function of the number of bits used in the sentence embedding. For the case of $T_\sigma$, the results after 8-bit quantization are shown because, in the range under consideration, they are better that those of full precision. For the case of $T_\beta$, results for decoders of size 128 and 256 are shown. Notably, for budgets under 768 bits, $T_\beta$ leads to consistently better accuracy than $T_\sigma$. In fact, for a budget of 448 bits, the auto-encoder using $T_\beta$ is already performing at above 90% accuracy, even when using a decoder with just 256 dimensions. This suggests that by using $T_\beta$ the auto-encoder learns a much more efficient code. If coupled with light-weight decoders (e.g. configured for 256 dimensions or less) this can represent a significant advantage for inference under low memory-budget scenarios.

The embodiments herein demonstrate that signal-parameterized noise can be used in conjunction with the natural dynamics of the optimizer to intrinsically alter the behavior of a neural network. The dynamics of the stochastic activation function observed in practice match what the model predicts. Also the stochastic activation function can effectively be used to obtain binarized sentence embeddings. Under extreme bit-rate constraints, the approach herein leads to better performance than simple post-training quantization strategies.

VI. EXAMPLE OPERATIONS

FIG. 12 is a flow chart illustrating an example neural network training embodiment. The process illustrated by FIG. 12 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 12 may be simplified by the removal of any one or more of the features shown therein. Further, these embodiments may be combined with features, aspects, and/or implementations of any of the previous figures or otherwise described herein.

Block 1200 may involve obtaining, by a computing system, a representation of a neural network including an input layer, and output layer, and a hidden layer, wherein nodes of the hidden layer incorporate serialized activation functions, wherein the serialized activation functions for each of the nodes include a sigmoid function and a Beta function, wherein the sigmoid function is applied to weighted outputs from nodes of a previous layer of the neural network, wherein the Beta function is applied to a conductance hyper-parameter and respective outputs of the sigmoid function, and wherein outputs of the Beta function are provided to a subsequent layer of the neural network. The conductance hyper-parameter may take on values in the range of 0.1 to 2.0 or narrower ranges therein.

Block 1202 may involve training, by the computing system, the neural network until the outputs of the sigmoid function for the nodes of the hidden layer are substantially binary.

In some embodiments, the previous layer is the input layer. In some embodiments, the subsequent layer is the output layer.

In some embodiments, the respective outputs of the sigmoid function for the nodes of the hidden layer being substantially binary comprises at least 80% of the respective outputs of the sigmoid function for the nodes of the hidden layer being below 0.1 or above 0.9.

In some embodiments, the respective outputs of the sigmoid function for the nodes of the hidden layer being substantially binary comprises at least 70% of the respective outputs of the sigmoid function for the nodes of the hidden layer being below 0.01 or above 0.99.

In some embodiments, after training, an expected value of the outputs of the Beta function is within 1% of an expected value of the respective outputs of the sigmoid function for the nodes of the hidden layer.

In some embodiments, parameters of the Beta function are: (i) the conductance hyper-parameter multiplied by the respective outputs of the sigmoid function, and (ii) the conductance hyper-parameter multiplied by a difference, wherein the difference is one minus the respective outputs of the sigmoid function.

In some embodiments, the outputs of the Beta function are further from 0.5 than the respective outputs of the sigmoid function.

Some embodiments may involve replacing the Beta function in the neural network as trained with a thresholding function that produces binary outputs, and writing, to the persistent storage, the representation of the neural network.

In some embodiments, the input layer is part of an encoder with n inputs and the output layer is part of a decoder with n outputs, and wherein training the neural network comprises: (i) calculating a loss function over the n inputs and the n outputs; and (ii) using backpropagation to modify weights of the weighted outputs.

In some embodiments, the hidden layer is one of a plurality of hidden layers in the neural network.

Figure 13:
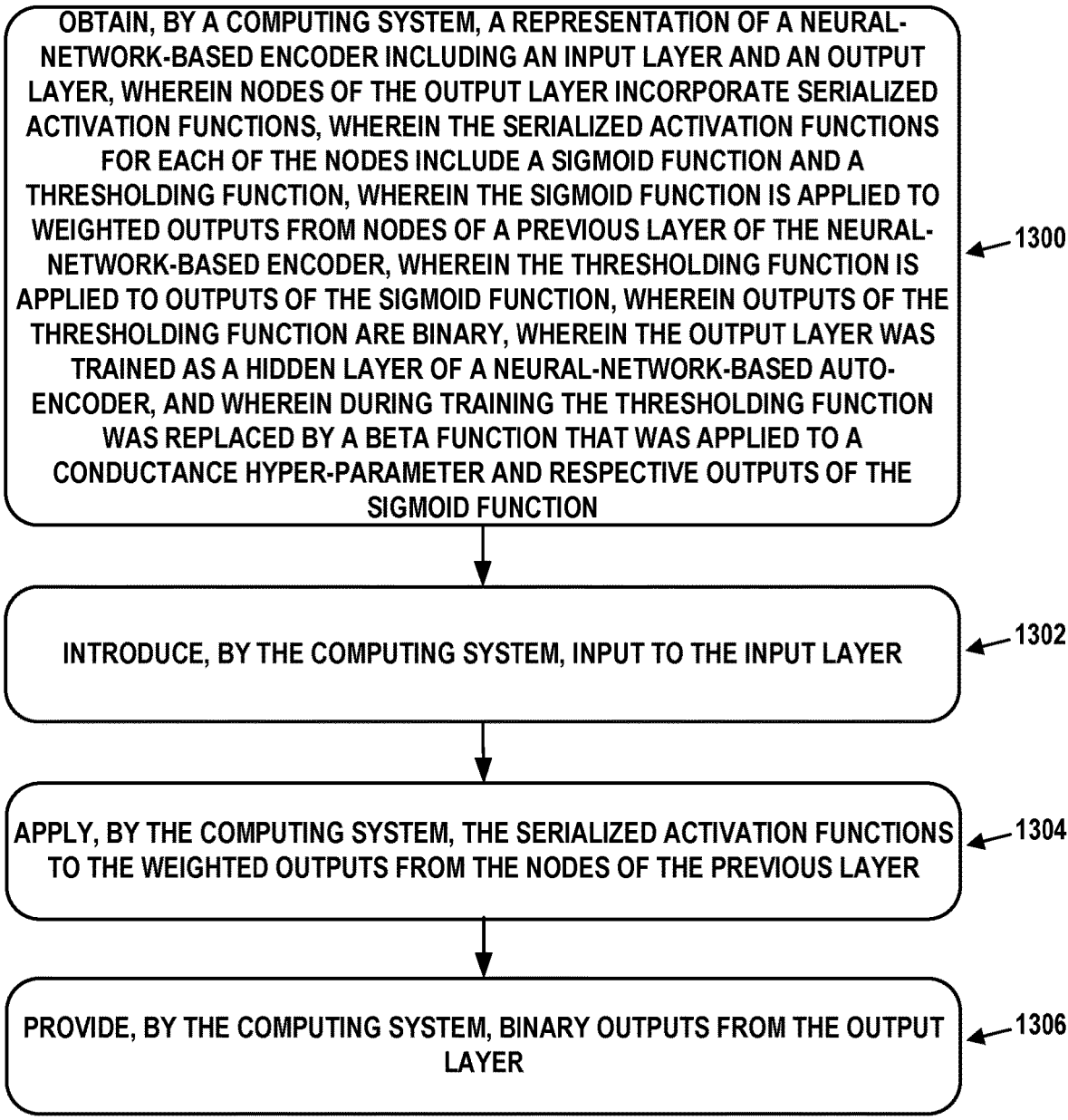
FIG. 13 is another flow chart, in accordance with example embodiments.

FIG. 13 is a flow chart illustrating an example neural network inference embodiment. The process illustrated by FIG. 13 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 13 may be simplified by the removal of any one or more of the features shown therein. Further, these embodiments may be combined with features, aspects, and/or implementations of any of the previous figures or otherwise described herein.

Block 1300 may involve obtaining, by a computing system, a representation of a neural-network-based encoder including an input layer and an output layer, wherein nodes of the output layer incorporate serialized activation functions, wherein the serialized activation functions for each of the nodes include a sigmoid function and a thresholding function, wherein the sigmoid function is applied to weighted outputs from nodes of a previous layer of the neural-network-based encoder, wherein the thresholding function is applied to outputs of the sigmoid function, wherein outputs of the thresholding function are binary, wherein the output layer was trained as a hidden layer of a neural-network-based auto-encoder, and wherein during training the thresholding function was replaced by a Beta function that was applied to a conductance hyper-parameter and respective outputs of the sigmoid function. The conductance hyper-parameter may take on values in the range of 0.1 to 2.0 or narrower ranges therein.

Block 1302 may involve introducing, by the computing system, input to the input layer.

Block 1304 may involve applying, by the computing system, the serialized activation functions to the weighted outputs from the nodes of the previous layer.

Block 1306 may involve providing, by the computing system, binary outputs from the output layer.

In some embodiments, the previous layer is the input layer.

In some embodiments, the neural-network-based auto-encoder was trained until the respective outputs of the sigmoid function for the nodes of the hidden layer were substantially binary.

In some embodiments, the respective outputs of the sigmoid function for the nodes of the hidden layer being substantially binary comprises at least 80% of the respective outputs of the sigmoid function for the nodes of the hidden layer being below 0.1 or above 0.9.

In some embodiments, the respective outputs of the sigmoid function for the nodes of the hidden layer being substantially binary comprises at least 70% of the respective outputs of the sigmoid function for the nodes of the hidden layer being below 0.01 or above 0.99.

In some embodiments, after training, an expected value of the outputs of the Beta function is within 1% of an expected value of the respective outputs of the sigmoid function for the nodes of the hidden layer.

In some embodiments, parameters of the Beta function are: (i) the conductance hyper-parameter multiplied by the respective outputs of the sigmoid function, and (ii) the conductance hyper-parameter multiplied by a difference, wherein the difference is one minus the respective outputs of the sigmoid function.

In some embodiments, the outputs of the Beta function are further from 0.5 than the respective outputs of the sigmoid function.

In some embodiments, the hidden layer is one of a plurality of hidden layers in the neural-network-based auto-encoder.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   persistent storage containing a representation of a neural-network-based encoder including an input layer and an output layer, wherein nodes of the output layer incorporate serialized activation functions, wherein the serialized activation functions for each of the nodes include a sigmoid function and a thresholding function, wherein the sigmoid function is applied to weighted outputs from nodes of a previous layer of the neural-network-based encoder, wherein the thresholding function is applied to outputs of the sigmoid function, wherein outputs of the thresholding function are binary, wherein the output layer was trained as a hidden layer of a neural-network-based auto-encoder, and wherein during training the thresholding function was replaced by a Beta function that was applied to a conductance hyper-parameter and respective outputs of the sigmoid function; and
   one or more processors configured to:
   introduce input to the input layer;
   apply the serialized activation functions to the weighted outputs from the nodes of the previous layer; and
   provide binary outputs from the output layer.

2. The system of claim 1, wherein the previous layer is the input layer.

3. The system of claim 1, wherein the neural-network-based auto-encoder was trained until the respective outputs of the sigmoid function for the nodes of the hidden layer were substantially binary, wherein being substantially binary comprises a first threshold percentage of the respective outputs of the sigmoid function for the nodes of the hidden layer being within a second threshold of 0 or within a third threshold of 1.

4. The system of claim 3, wherein the first threshold percentage comprises at least 80% of the respective outputs being within a second threshold of 0 comprises being below 0.1, and being within a third threshold of 1 comprises being or above 0.9.

5. The system of claim 3, wherein the first threshold percentage comprises at least 70% of the respective outputs being within a second threshold of 0 comprises being below 0.01, and being within a third threshold of 1 comprises being above 0.99.

6. The system of claim 1, wherein, after training, an expected value of the outputs of the Beta function is within 1% of an expected value of the respective outputs of the sigmoid function for the nodes of the hidden layer.

7. The system of claim 1, wherein parameters of the Beta function are: (i) the conductance hyper-parameter multiplied by the respective outputs of the sigmoid function, and (ii) the conductance hyper-parameter multiplied by a difference, wherein the difference is one minus the respective outputs of the sigmoid function.

8. The system of claim 1, wherein the outputs of the Beta function are further from 0.5 than the respective outputs of the sigmoid function.

9. The system of claim 1, wherein the hidden layer is one of a plurality of hidden layers in the neural-network-based auto-encoder.

10. A computer-implemented method comprising:
    obtaining, by a computing system, a representation of a neural-network-based encoder including an input layer and an output layer, wherein nodes of the output layer incorporate serialized activation functions, wherein the serialized activation functions for each of the nodes include a sigmoid function and a thresholding function, wherein the sigmoid function is applied to weighted outputs from nodes of a previous layer of the neural-network-based encoder, wherein the thresholding function is applied to outputs of the sigmoid function, wherein outputs of the thresholding function are binary, wherein the output layer was trained as a hidden layer of a neural-network-based auto-encoder, and wherein during training the thresholding function was replaced by a Beta function that was applied to a conductance hyper-parameter and respective outputs of the sigmoid function;

introducing, by the computing system, input to the input layer;

applying, by the computing system, the serialized activation functions to the weighted outputs from the nodes of the previous layer; and providing, by the computing system, binary outputs from the output layer.

11. The computer-implemented method of claim 10, wherein the previous layer is the input layer.

12. The computer-implemented method of claim 10, wherein the neural-network-based auto-encoder was trained until the respective outputs of the sigmoid function for the nodes of the hidden layer were substantially binary, wherein being substantially binary comprises a first threshold percentage of the respective outputs of the sigmoid function for the nodes of the hidden layer being within a second threshold of 0 or within a third threshold of 1.

13. The computer-implemented method of claim 12, wherein the first threshold percentage comprises at least 80% of the respective outputs being within a second threshold of 0 comprises being below 0.1 and being within a third threshold of 1 comprises being above 0.9.

14. The computer-implemented method of claim 12, wherein the first threshold percentage comprises at least 70% of the respective outputs being within a second threshold of 0 comprises being below 0.01 and being within a third threshold of 1 comprises being above 0.99.

15. The computer-implemented method of claim 10, wherein, after training, an expected value of the outputs of the Beta function is within 1% of an expected value of the respective outputs of the sigmoid function for the nodes of the hidden layer.

16. The computer-implemented method of claim 10, wherein parameters of the Beta function are: (i) the conductance hyper-parameter multiplied by the respective outputs of the sigmoid function, and (ii) the conductance hyper-parameter multiplied by a difference, wherein the difference is one minus the respective outputs of the sigmoid function.

17. The computer-implemented method of claim 10, wherein the outputs of the Beta function are further from 0.5 than the respective outputs of the sigmoid function.

18. The computer-implemented method of claim 10, wherein the hidden layer is one of a plurality of hidden layers in the neural-network-based auto-encoder.

19. An article of manufacture including a non-transitory computer-readable medium, having stored thereon program instructions that, upon execution by a computing device, cause the computing device to perform operations comprising:

obtaining a representation of a neural-network-based encoder including an input layer and an output layer, wherein nodes of the output layer incorporate serialized activation functions, wherein the serialized activation functions for each of the nodes include a sigmoid function and a thresholding function, wherein the sigmoid function is applied to weighted outputs from nodes of a previous layer of the neural-network-based encoder, wherein the thresholding function is applied to outputs of the sigmoid function, wherein outputs of the thresholding function are binary, wherein the output layer was trained as a hidden layer of a neural-network-based auto-encoder, and wherein during training the thresholding function was replaced by a Beta function that was applied to a conductance hyper-parameter and respective outputs of the sigmoid function;

introducing input to the input layer;

applying the serialized activation functions to the weighted outputs from the nodes of the previous layer; and providing binary outputs from the output layer.

20. The article of manufacture of claim 19, wherein the neural-network-based auto-encoder was trained until the respective outputs of the sigmoid function for the nodes of the hidden layer were substantially binary, wherein being substantially binary comprises a first threshold percentage of the respective outputs of the sigmoid function for the nodes of the hidden layer being within a second threshold of 0 or within a third threshold of 1.

21. The article of manufacture of claim 20, wherein the first threshold percentage comprises at least 80% of the respective output being within a second threshold of 0 comprises being below 0.1, and being within a third threshold of 1 comprises being above 0.9.

22. The article of manufacture of claim 20, wherein the first threshold percentage comprises at least 70% of the respective outputs being within a second threshold of 0 comprises being below 0.01, and being within a third threshold of 1 comprises being above 0.99.

* * * * *